US007873708B2

(12) United States Patent
Durand et al.

(10) Patent No.: US 7,873,708 B2
(45) Date of Patent: Jan. 18, 2011

(54) SYSTEMS AND METHODS FOR PROVIDING MOBILE ADVERTISING AND DIRECTORY ASSISTANCE SERVICES

(75) Inventors: Terry Durand, Roswell, GA (US);
Fulvio Cenciarelli, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1209 days.

(21) Appl. No.: 11/118,800

(22) Filed: Apr. 28, 2005

(65) Prior Publication Data

US 2005/0245241 A1 Nov. 3, 2005

Related U.S. Application Data

(60) Provisional application No. 60/566,016, filed on Apr. 28, 2004.

(51) Int. Cl.
*G06F 15/16* (2006.01)
*G06F 17/00* (2006.01)
(52) U.S. Cl. ...................................... 709/219; 715/201
(58) Field of Classification Search ................ 709/204, 709/206, 207, 219, 226, 229; 707/3, 4, 6; 715/201, 202
See application file for complete search history.

(56) References Cited

U.S. PATENT DOCUMENTS

| 5,839,088 | A | | 11/1998 | Hancock et al. |
| 6,047,236 | A | | 4/2000 | Hancock et al. |
| 6,119,012 | A | * | 9/2000 | Amirijoo ................. 455/456.1 |
| 6,122,293 | A | * | 9/2000 | Frodigh et al. .............. 370/473 |
| 6,202,023 | B1 | | 3/2001 | Hancock et al. |
| 6,223,122 | B1 | | 4/2001 | Hancock et al. |
| 6,339,744 | B1 | | 1/2002 | Hancock et al. |
| 6,343,317 | B1 | * | 1/2002 | Glorikian ..................... 709/218 |
| 6,381,465 | B1 | * | 4/2002 | Chern et al. ................. 455/466 |
| 6,473,692 | B2 | | 10/2002 | Hancock et al. |
| 6,583,716 | B2 | | 6/2003 | Rangarajan et al. |
| 6,775,560 | B2 | * | 8/2004 | King et al. ................... 455/566 |
| 6,862,445 | B1 | | 3/2005 | Cohen |
| 6,972,786 | B1 | * | 12/2005 | Ludwig ................... 348/14.11 |
| 7,096,030 | B2 | * | 8/2006 | Huomo ..................... 455/456.3 |

(Continued)

OTHER PUBLICATIONS

Sevanto, J, "Multimedia Messaging Service for GPRS and UMTS", IEEE, 1999.*

(Continued)

*Primary Examiner*—J Bret Dennison
(74) *Attorney, Agent, or Firm*—Parks IP Law LLC; Jonathan A. Paulis

(57) ABSTRACT

Rich multimedia content is provided to a wireless device, particularly in response to a request for directory assistance generated by a client application. The multimedia content is provided as a multimedia message including bundled multimedia elements such as images, sound, text, and video files. The multimedia elements are compiled into a single multimedia presentation or deck that includes multiple screens that are automatically advanced for the convenience of the wireless device user. The user can interact with elements of the multimedia presentation, for example by placing orders, providing payment information, controlling playback, and forwarding or saving the deck to the wireless device. Multiple decks may be retrieved by a single request, and the decks are presented in an order determined by a bidding system or according to user preferences. Elements can be presented visually and/or audibly, and the user can interact using voice commands, manual entries, or stored entries.

26 Claims, 9 Drawing Sheets

U.S. PATENT DOCUMENTS

| | | | |
|---|---|---|---|
| 7,216,034 B2 * | 5/2007 | Vitikainen et al. | 701/208 |
| 7,286,823 B2 * | 10/2007 | Reinholdsson et al. | 455/419 |
| 7,343,564 B2 * | 3/2008 | Othmer | 715/774 |
| 7,441,203 B2 * | 10/2008 | Othmer et al. | 715/774 |
| 7,454,164 B2 * | 11/2008 | Goss | 455/3.01 |
| 7,463,898 B2 * | 12/2008 | Bayne | 455/466 |
| 2001/0032193 A1 | 10/2001 | Ferber | |
| 2002/0107027 A1 | 8/2002 | O'Neil | |
| 2002/0137507 A1 * | 9/2002 | Winkler | 455/426 |
| 2003/0033331 A1 * | 2/2003 | Sena et al. | 707/513 |
| 2003/0114146 A1 | 6/2003 | Benson | |
| 2003/0134648 A1 * | 7/2003 | Reed et al. | 455/456 |
| 2003/0216143 A1 * | 11/2003 | Roese et al. | 455/456.1 |
| 2003/0216144 A1 * | 11/2003 | Roese et al. | 455/456.1 |
| 2003/0220835 A1 * | 11/2003 | Barnes, Jr. | 705/14 |
| 2004/0030601 A1 * | 2/2004 | Pond et al. | 705/16 |
| 2004/0215692 A1 | 10/2004 | Vasudevan et al. | |
| 2004/0224705 A1 | 11/2004 | Nishimura | |
| 2004/0243519 A1 * | 12/2004 | Perttila et al. | 705/75 |
| 2005/0144065 A1 * | 6/2005 | Calabria et al. | 705/14 |
| 2005/0177419 A1 * | 8/2005 | Choi et al. | 705/14 |
| 2009/0132378 A1 * | 5/2009 | Othmer et al. | 705/14 |

OTHER PUBLICATIONS

OpenMotion LS, Mobile-Yellow Pages, Wireless Yellow Pages, Location Based Services, https://www.openmotion.com/secure/index.aspx As printed on Nov. 4, 2003.

OpenMotion LS Featurs, https://www.openmotion.com/features.asp As printed on Nov. 4, 2003.

Wireless Developer Network—Daily News, "AirFlash and Cambridge Positioning Systems Team to Deliver High Accuracy Location Services to Wireless Carriers," As printed on 11.

Yellow Page Directories Have Gone Wireless, http://www.go2online.com/landing/indexLanding.cfm, as printed Nov. 4, 2003.

ZED, Sonera starts to provide location-based mobile yellow pages. http://www.zed.com/zed/ssmp/www/products_temp/1,,347,00.html As printed on Nov. 14, 2003.

Zlate stranky On Line, "Yellow Pages Via WAP," http://www.zlatestranky.sk/view.jsp?page=wap&language=EN As printed on 11/4/03.

* cited by examiner

SYSTEMS AND METHODS FOR PROVIDING MOBILE ADVERTISING AND DIRECTORY ASSISTANCE SERVICES

CROSS-REFERENCE TO RELATED APPLICATIONS

The present invention claims the benefit of the filing date of U.S. Provisional Patent Application Ser. No.60/566,016 filed on Apr. 28, 2004

BACKGROUND OF THE INVENTION

1. Field of the Invention

The present invention relates to wireless communications, and in particular to systems and methods for providing mobile advertising and directory service to wireless handsets in a rich multimedia format.

2. Description of the Related Art

As a convenience for users and an opportunity for marketers and wireless service providers, the prospect of providing commercial directory assistance that includes promotional information is very desirable. Given the saturation of wireless devices today, the expectation of convenience that users of these devices expect, and the potential revenues, it is not surprising that such a service is very desirable to all involved.

Attempts to provide mobile advertising and directory assistance are impractical and inconvenient, or have otherwise fallen short of expectations. Most prevalent is the ubiquitous 411 directory assistance service that simply provides an audibly communicated telephone number for the requested merchant, along with autodial features. Systems are being developed to supplement this most basic contact information with visible banner advertisements and the like. However, existing systems are typically based on mobile messaging technologies such as WML (Wireless Markup Language) and WAP (Wireless Access Protocol), which provide static responses to directory assistance requests and cannot provide interactive presentations that include audio and animation.

Other systems rely on short range wireless transmission protocols that only communicate with wireless devices that are in proximity to a transmitter.

Still other systems require the user to connect to the Internet to view target advertising and/or directory assistance data. In such systems, a client computer system uploads a request for data to an Internet server. The data is provided as a universal resource locator (URL) address of a particular enhanced server that matches the client's request. The client computer system then launches a web browser and connects to the enhanced server to retrieve the requested data, which may be displayed automatically. Such systems do not allow the client to save or forward the data, and provide only limited capacity to automatically present a series of data elements as an orchestrated presentation including various screens.

Existing systems also fail to provide practical distribution channels for publishing advertising and directory assistance information for retrieval by a mobile station. Rather, one approach is to equip each merchant or store with a transmitting and receiving system for broadcasting advertising messages to certain mobile stations. This approach is ungainly, requiring expensive and redundant equipment that must be maintained and programmed by merchant staff.

There is a need, therefore, to provide current and location-specific mobile advertising and directory information to wireless handsets in a rich multimedia format that is interactive, easily authored, and readily updatable.

SUMMARY OF THE INVENTION

The systems and methods of the various embodiments of the present invention address the shortcomings described above by delivering bundled advertising, directory assistance, and other multimedia content to a mobile communications device in response to a custom search query generated by the user of the mobile station. The bundled content is delivered to the user as an interactive multimedia "deck" in a wireless messaging format that can be administered and manipulated by the user. For example, preferred embodiments enable the user to view, store, retrieve, replay, and forward all or part of the content comprising a particular deck. Furthermore, content can be published in a variety of standard media (e.g., text, data, executable code, and images) that can be retrieved by a user without being translated into a tagged format, such as Wireless Markup Language. The systems and methods of the invention have the advantage of utilizing common message stores thereby facilitating interoperability with various mobile and fixed networks, as well as the Internet. The invention also provides advertising, directory assistance, and other multimedia content in rich interactive presentation formats that can include animated images, video, and audio, as well as text.

More specifically, a host, such as a directory assistance provider, provides a user of a mobile station such as a cellular telephone access to a client-side content delivery application (CDA client), possibly as a subscription service offering. The CDA client facilitates retrieval of content such as directory assistance data associated with one or more merchant providers of goods and services that are of interest to the user. The CDA client is a software application or other executable code that resides on the mobile station or is otherwise activated and controlled at least in part by commands issued from the mobile station.

The CDA client is preferably accessible via the primary user interface of the mobile station. The primary user interface can be any device or system that allows for the exchange of information between the user, the mobile station, and any remote processing and/or communications systems. The primary user interface preferably includes a graphical user interface (GUI), such as a main menu that includes various text, icons or voice prompts that enable the user to control the operation of the mobile station, including applications such as voicemail, multimedia messaging, address book, and system setup. The GUI includes means for receiving user input and means for providing output via other components of the primary user interface, such as a keypad, touch screen, microphone, speaker, audio playback device, printer, joystick, and the like. The CDA client is preferably launched by the user's interaction with the GUI using the input/output components of the primary user interface.

In certain embodiments, the directory assistance data includes rich multimedia content such as related animations, video, audio, text, and/or graphical images. Examples of graphical images include photographs, drawings, advertisements, coupons, maps, and logos associated with the merchants. The visual components of the multimedia content are preferably viewed by the user via a display means such as a screen that is integral to the mobile station, or via a linked display device such as a "heads-up" windshield display, navigation system screen, mobile video screen (e.g., an onboard television screen in a vehicle) or any other video or still image playback device directly or wirelessly accessible by the CDA client. The audio components of the multimedia content can be played via the mobile station speaker, hands-free system, built-in vehicle speakers, or any other audio playback device directly or wirelessly accessible by the CDA client.

According to one aspect of the invention, the content is specific to at least one location associated with the user of the mobile station. The content may be particularly relevant to the user's current location, as established by information supplied by the user or via geographic positioning and data communication technologies such as the Global Positioning System (GPS), Assisted GPS (AGPS), or any other trilateration, triangulation, or telemetry technology, including time delay of arrival and cell site identification techniques. Alternatively, the content may be relevant to any location that is of interest to the user, such as a location the user regularly visits or intends to visit in the future.

Another aspect of the invention is the user's ability, via the CDA client, to exchange information with a content server, and to interact with the content delivered to the user's mobile station. In certain embodiments, the user interacts manually via one or more input/output devices such as a joystick, keypad, or touchscreen. In certain other embodiments, the user interacts using voice commands that are interpreted by a computer or human intermediary. In still other embodiments, both manual and vocal interaction takes place.

The user can direct the CDA client to retrieve specific content by providing one or more keywords or phrases as search criteria, the search criteria including parameters such as: the user's current or target location (e.g., ZIP code, city/county/state; cross streets; landmarks (e.g., airports, hotels, highway access points, and area codes); category of goods or services desired; merchant name; merchant status (e.g., search only merchants offering special deals or search only stores that are currently open); and any other information that will limit the response to the search query to useful, practical, and desirable results. The search criteria can be spoken or manually entered using input devices. Predictive text or speech recognition technology can be implemented to reduce the amount of input required of the user. For example, the user may save favorite searches or recent searches may be cached for easy retrieval.

The search criteria are communicated preferably as a search query to the content server via any suitable wireless voice or data communications protocol, including but not limited to SMS, USSD, MMS, or EMS.

In certain embodiments, the content server or other intermediate relay platform maps the elements of the search query to specific content published in a publishing system. The content server can be separate from or integral to the publishing system. The publishing system then responds by providing the requested content for delivery either to the mobile station or to an intermediate network element, preferably via the content server. The search query may be transmitted over any suitable wireless communications pathway or bearer, such as a signaling, data traffic, or voice channel.

The response to the search query preferably includes information identifying bundled multimedia content that can be delivered to the user via any suitable existing or yet to be developed wireless data service protocol, such as MMS, EMS, M@GIC4, and WAP. For example, the content can be one or more bundles of advertising and directory assistance data accessible to the user as an interactive list of "hits" indicating merchants that satisfy the search criteria.

Each entry in the list of hits identifies a bundle of multimedia content that is specific to that merchant, hereinafter referred to as a "deck." The deck can include various elements, including: contact information for the merchant; an interactive (e.g., AGPS navigable) map; audible or viewable directions; scannable, beamable, forwardable or otherwise redeemable coupons; video; audio; animation; hyperlinks for accessing merchant websites; merchant identifiers such as logos; and a "call-to-action" interface. Text elements of decks can be translated to voice for audio delivery. The call-to-action interface notifies the user that the CDA client will autodial or send a message or other data to the merchant after a certain time elapses or in response to the user issuing manual or voice commands.

In the exemplary embodiments, each deck includes a Synchronized Multimedia Integration Language (SMIL) file that includes all of the instructions necessary to define the manner of presenting the bundle of multimedia content in the deck via the CDA client. SMIL files are delivered and stored as multimedia messages or as parts of multimedia messages having the file extension *.smil, and define at least the following elements: the layout of the presentation; the timing of the presentation; and the source of each element of the multimedia content. Each SMIL file is composed using a markup language that is based on eXtensible Markup Language (XML) and includes various tags. For example, a SMIL file starts with a <smil> tag, ends with a </smil> closing tag, and must contain a <body> element. The <body> element contains the media elements. The SMIL file may also contain a <head> element that stores information about the presentation layout and other meta information.

A deck may provide visual and audible access to all of the multimedia content from a single screen. Alternatively, a deck can include several "cards" that display portions of the multimedia content. For instance, one card may display the merchant's logo and play a promotional audio clip. Another card may include streaming video and audio elements of one of the merchant's commercials. Another card may display a coupon with a bar code or other scannable image. Another card may display an interactive map. Another card may display and/or audibly communicate directions to the merchant's location. Each card includes one or more elements, either alone or in combination.

The cards of a deck may automatically cycle, such that the user sees and/or hears one card for a certain time (e.g., 10 seconds) before the next card in the same deck is presented. The timing of the presentation including the cards of the deck may be predefined before the deck is delivered, or may be variable according to the preferences of the user.

The deck preferably includes navigation controls that enable the user to halt, accelerate or decelerate cycling of the cards, to view a particular card in the deck, or to advance to another deck, either manually or using voice commands. Similarly, multiple decks retrieved by the user may autoplay one after the other, and the pages in each deck may automatically cycle as mentioned above.

The decks can be, but are not necessarily, delivered to the mobile station with the list of hits. Alternatively, to conserve memory and network resources, the list of hits can act as an interface for the user to issue a more specific "pick" query to the content router. The pick query allows the user to pick (i.e. request delivery of) one or more specific decks for storage in a memory of the mobile station. To this end, entries in the list of hits may be accessible one by one, or may include means for selecting such as check boxes or radio controls, the selecting means enabling the user to request delivery of more than one deck at a time.

When a deck is actually delivered to the mobile station with the initial query or with a subsequent pick query, the deck is preferably stored in the memory of the mobile station as a multimedia message. Advantageously, the message can be wirelessly forwarded or transmitted directly to other mobile stations, and can be uploaded to another mobile station or computer via a sync operation. Furthermore, each message may include a flag or executable code that identifies the user for targeted updates or replacement of all or part of the message elements (e.g., new coupons, ads, specials), or for targeted advertisements such as additional text, voice, or multimedia messages. For example, receiving delivery of a particular merchant's deck can trigger a mobile station to execute code that sends identifying information back to the content server. Then, whenever the content published to the publishing system is updated, a corresponding update is sent to the mobile station via the content server to either update or replace the deck that is stored on the mobile station.

In certain embodiments, the search query and/or list of hits can also be stored as a "favorite" search that can be subsequently accessed, repeated, or updated. Queries, hit lists, and decks may be manually stored by a user command, or can be automatically stored in a temporary or permanent cache for later retrieval and/or deletion. Queries, hit lists, and decks may be also be deleted automatically after a certain period of time, according to memory reserves, or after being viewed, forwarded, uploaded, or issued.

Certain aspects such as the composition of queries, organization of the list of hits, and playback of decks may be according to the user's preference. Therefore, another aspect of the invention is a user preferences module. The preferences module is preferably but not necessarily a software module or subroutine that is integral to the CDA client. The preferences module is accessible to the user when the CDA client is installed or set up for first use. The preferences module may also be accessible upon demand. For example, the user may launch the preferences module to occasionally alter previously expressed preferences when launching the CDA client or via the primary user interface, by activating a separate icon or command in the main menu of the mobile station.

Alternatively, the list of hits may be organized according to a keyword bidding system. The host generates or maintains a list of keywords that describe commonly requested goods and services. The keywords are then marketed to merchants. A merchant may purchase or buy priority to one or more keywords that are applicable to the goods or services that that merchant provides. For example, the word "pizza" may be a keyword.

In certain embodiments, a specific pizza restaurant chain may purchase the "pizza" keyword from the host, such that any user submitting "pizza" as search criteria receives a hit list that contains only decks that correspond to the purchaser's chain. The hit list received by the user may be refined and/or ordered by additional search criteria in the user's query or preferences, such as restaurant locations that are within a predetermined distance from the user's current or target location.

In certain other embodiments, the aforementioned pizza restaurant chain may buy priority to a preferred slot in the hit list corresponding to this keyword, such that any user submitting "pizza" as search criteria receives a hit list that contains decks that are ordered by priority. Purchase of the first slot entitles the purchaser to be the first pizza provider shown in the hit list. Purchase of the second slot may be less expensive, and entitles the purchaser to be the second provider shown in the hit list. The decks may also be refined by additional search criteria, such that the first slot purchaser may be omitted from the hit list if the first slot purchaser has no restaurants that fit the remaining search criteria. For example, the user may specify "only restaurants that are open now" as additional search criteria. If the first slot purchaser's nearby restaurants are currently closed, the second slot purchaser may appear first in the hit list, followed by subsequent slot purchasers. In certain embodiments, only the first few slots are initially viewable by the user. The subsequent slots and/or merchants that are not participants in the bidding system may be accessible to the user by issuing an additional command, such as by clicking on a "more" icon or issuing a voice command.

The successful purchase or slotting of a keyword can be accomplished by being the highest bidder in a keyword auction, which is preferably held periodically. In addition to or in lieu of paying premiums for keywords, a merchant may pay the host event-driven fees, such as a fee for every instance of a user downloading the merchant's deck or redeeming a downloaded coupon.

Alternatively, the list of hits may be ordered according to the popularity of particular merchants. For example, if the pizza restaurant chain is most frequently requested by name, or if its deck is downloaded more often than any other restaurant or chain, its deck may be displayed first in the hit list. To determine the popularity, certain embodiments of the invention include systems and methods of statistically analyzing user queries and individual deck downloads.

As mentioned, the list of hits can include clickable text and/or graphical icons that function as predefined linkages, much like hyperlinks, by providing access to and/or requesting delivery of the contents of a deck that is identifiable via the text or icons. The list of hits can also be communicated audibly to the user, preferably in conjunction with voice response functionality that allows the user to select an entry, replay the list, and to stop and restart communication of the list. The hit list may also be communicated via a geographical map that is related to the user's current or target location, and on which each hit is marked with clickable text and/or graphical icons.

The present invention also includes systems and methods for redeeming a coupon delivered to the user in response to the search query. As mentioned above, the coupon can be presented as a portion of a deck. The coupon can include a machine or human readable identifier, such as a bar code, encrypted or unencrypted data string, or an audible or viewable passcode. The user may redeem the coupon in several ways. In certain embodiments, the coupon includes an icon or other control that prompts the user to redeem the coupon wirelessly. Wireless redemption may take place via any known or yet to be developed short or long-range wireless communication technologies including but not limited to SMS messages, infrared data ports, Bluetooth, 802.11, or Wi-Fi. For example, the call-to-action interface may generate an SMS message indicating that the user intends to take advantage of the advertised special, and requesting the merchant to prepare the advertised item for pickup or delivery to an address embedded in the redemption message or identified as a default address in the preferences module. In certain other embodiments, the coupon is redeemable by presenting it in person at the merchant's location, such as by showing the coupon displayed on or audibly broadcast from the mobile station or printed out as a hard copy, or by allowing the merchant to scan a bar code or other machine readable means for optically or otherwise communicating data to a scanning device. In still other embodiments, the coupon can be redeemed by placing a voice call to the merchant and reciting a coupon code or text included in the deck.

The present invention also includes systems and methods for ordering products and services from merchants by interacting with the content received, for example, in response to a search query. More specifically, in these embodiments, a deck that is delivered to the CDA client will include an interactive menu or other list of products or services. The user can interact with this menu, for example, by clicking on a menu item (represented by a hyperlink or icon), or by issuing a voice command (e.g., "order menu item 1"). This interaction triggers a transaction by which the user orders the menu item, which may be any good or service including food and products. The entire transaction can be completed with a single command such as a click, or several additional steps may be required, including for example, transmission of order details such as user identification information, payment method, fulfillment method (e.g., pickup, delivery, and download), quantity, color, size, delivery address, delivery date/time, and the like. In the single command embodiments, information from a "digital wallet" stored on the handset may be transferred when the user interacts with the menu item. The digital wallet data preferably includes encrypted credit card and billing data, and a default delivery address. Digital wallet data can be made available to the CDA client by upload, transfer from or interface with other handset applications, or data entry preferably via the preferences application. Alternatively, the digital wallet data may be stored remotely, either centrally (e.g., at the host) or with the user's favorite merchants. These single click embodiments require the user to perform a one-time registration procedure either wirelessly, via the Internet, or in person, to provide billing and delivery information for remote storage. When the user selects a menu item, the CDA client passes user identification information such as a digital certificate or other unique identifier that identifies the user, and retrieves the corresponding digital wallet data from the remote repository. If the remote repository is maintained by the host, the digital wallet data is subsequently transmitted to the appropriate merchant along with the order, preferably via a secure communications connection. If the remote repository is maintained by the merchant, the merchant receives the order and the unique identifier, and then retrieves the corresponding digital wallet data from the merchant's repository.

The user may be charged for using the CDA client. For example, the user may pay a per-use fee for each deck viewed or for each search query issued. To this end, call detail records are generated and collected in the network for interface with a wireless service billing system that calculates the fee for receiving decks or for subscribing to the service. Alternatively, the user may pay a one time or periodic fee.

In certain embodiments, use of the CDA client is subsidized by the host, merchant, or some other party. If, for instance, the user is charged one dollar for each deck viewed, a merchant can reimburse that dollar if the user redeems a coupon included in the deck or otherwise visits or patronizes the merchant's business pursuant to viewing the deck. The partial or full reimbursement can be credited to the user's wireless service account, via the billing interface to the wireless billing system. The reimbursement can also be effected via a discount on goods and services issued directly from the merchant at the time of redemption.

Another aspect of the invention is the ability to selectively "push" multimedia content to a user that has not specifically requested that information. In the embodiments in which the user's location can be automatically determined using geographic positioning technologies such as GPS, decks that are particularly relevant can be automatically and proactively delivered to the user. For example, if the user is within five miles of the pizza restaurant, and the user is moving less than 50 miles per hour, then a deck from the pizza restaurant can be delivered informing the user of a special offer. As mentioned above, multimedia content can be pushed according to the user's previous search queries and downloads as well as the user's preferences.

The preferences module preferably allows the user to opt in or out and to establish preferences for receiving "pushed" multimedia content. For instance, the user can opt not to ever receive pushed content, to receive pushed content once a month/week/day in one or more messages, to receive pushed content only from certain merchants or certain merchant types, or to receive pushed content "real-time", i.e., as the content is generated or promulgated from the content server.

The invention also includes systems and methods for publishing multimedia content to the publishing system for retrieval via the content server and the CDA client. The content can be published to the publishing system by the host. Accordingly, a merchant can submit content in a developed condition, or can commission the host or another party to design and/or develop the content for the merchant. The content is then published to the publishing system.

Alternatively, the merchant can be provided direct access to the publishing system for "self publishing." The host may also provide client software as a self publishing interface between the merchant and the publishing system. Self publishing allows the merchant to easily and efficiently generate and publish new content according to short-term business needs. For example, on a slow business day, a merchant may push a deck to targeted users notifying the users of a sale.

The host or merchant publishes multimedia content remotely by accessing the publishing interface. The publishing interface facilitates compilation of the individual components of the multimedia content into cards, and then into a deck. Compilation may occur on a client device maintained by the merchant or other publisher, which then transmits completed decks to the publishing system. Alternatively, the multimedia content may be forwarded as individual elements for compilation by the content server. The publishing interface may generate instructions for the publishing system to compile the elements into the desired deck. Decks and/or publication information are preferably transmitted via a suitable data communication medium, such as a wireless data network or the Internet.

The invention also includes systems and methods for providing the services detailed above for legacy telephones that do not have multimedia capabilities. Such legacy mobile stations can structure and send queries as text messages or dial content specific feature codes such as *PIZZA on the keypad of the mobile station. Receipt of the query launches a remote application that performs the function of identifying the content that corresponds to the query, and delivers an initial response in the form of a hit list. The hit list may be a text listing of more specific feature codes that correspond to particular merchants. When the user dials one of the feature codes, the merchant's deck will be delivered as another text message. Alternatively, the hit list may consist of one or more text messages, each message corresponding to a particular merchant. To select a particular deck from the hit list, the user simply responds to the corresponding text message. Although legacy mobile stations typically have very limited multimedia capabilities, the content of the multimedia decks can be delivered in text format, including special offers, location-based directions, bar codes, and contact information.

These and other objects, features, and/or advantages may accrue from various aspects of embodiments of the present invention, as described in more detail below.

DETAILED DESCRIPTION OF THE INVENTION

As required, detailed embodiments of the present invention are disclosed herein. It will be understood that the disclosed embodiments are merely examples to illustrate aspects of the invention that may be embodied in various and alternative forms. The figures are not necessarily to scale, and some features may be exaggerated or minimized to show details of particular components. In other instances, well-known materials or methods have not been described in detail to avoid obscuring the present invention. Therefore, specific structural and functional details disclosed herein are not to be interpreted as limiting, but as a basis for the claims and for teaching one skilled in the art to variously employ the present invention.

Particular embodiments of the present invention will now be described in greater detail with reference to the figures, in which like numerals indicate like elements throughout the several views. The figures illustrate certain of the various aspects of exemplary embodiments of systems and methods for providing mobile advertising and directory assistance service to wireless devices in a rich multimedia format.

Although applicable to any existing or yet to be developed means for wireless data transmission including various wireless multimedia distribution protocols and networks, the aspects of the present invention will be described with reference to the MMS (Multimedia Messaging Service) service environment in the context of a GSM air interface that uses GPRS (General Packet Radio Service) as means for establishing data paths. Examples of other suitable wireless and radio frequency data transmission means include networks utilizing Time Division Multiple Access (TDMA), Frequency Division Multiple Access (FDMA), Wideband Code Division Multiple Access (WCDMA), Orthogonal Frequency Division Multiplexing (OFDM), and various other 2, 2.5, and 3G (where "G" refers to generation) and above wireless communications systems. Examples of other suitable means for establishing data paths include enabling bearers specified in standards defining Universal Mobile Telecommunications System (UMTS), Enhanced Data rates for Global Evolution (EDGE), High Speed Downlink Packet Access (HSDPA), and similar communications protocols.

Certain of the various systems and methods of the invention are directed to the performance of certain tasks, including but not limited to, compiling and formatting content for publication, publishing content for retrieval by multiple mobile stations, formulating a request for content, issuing the request for content, formulating a response to a request for content, issuing the response to the request for content, refining the request for content, reissuing the request for content, and delivering the requested content. Each of these tasks will now be described in greater detail with respect to the exemplary environment of FIGS. 1, 2, and 3.

Figure 1:
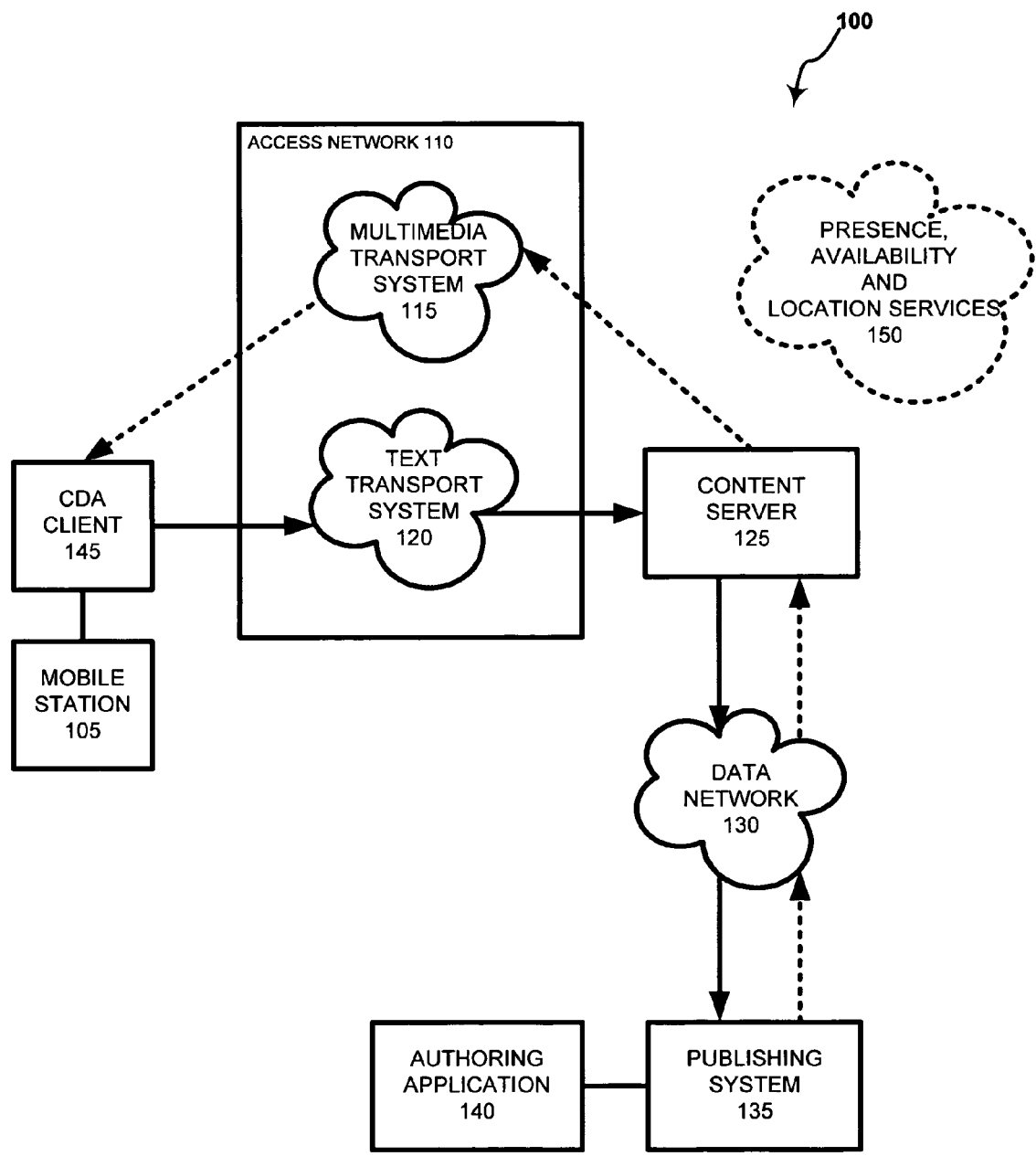
FIG. 1 is a high-level block diagram illustrating the functional elements of a preferred environment for the various embodiments of the present invention.

FIG. 1 is a block diagram illustrating the functional elements of a preferred environment 100 for the various embodiments of the present invention. The exemplary environment 100 includes a wireless device (shown as mobile station 105), an access network 110 (which includes a multimedia transport system 115 and a text transport system 120), content server 125, and an optional public data network 130 that serves as a medium for retrieving multimedia content from at least one publishing system 135. The multimedia content is developed using an authoring application 140 and retrieved by the mobile station 105 via a CDA Client 145. Preferably, the environment 100 includes means 150 for providing presence, availability, and location services, means 150 being for enabling the location of the mobile station 105 to be ascertained or verified automatically.

Publication of Content

Populating the publishing system 135 with content requires the authoring of multimedia and other data elements, compilation of those elements into decks, and formatting the decks into interactive multimedia presentations that can be incorporated into messages for retrieval by the content server 125 and subsequent delivery to users.

Content can be compiled and formatted for publication in a number of ways and in several locations. In certain embodiments, content is prepared either by the host or merchant, using an authoring application 140 that is integral to the publishing system 135. In other embodiments, the authoring application 140 is external to the publishing system 135, and content is prepared remotely and subsequently transferred to the publishing system 135. Content can be published to the publishing system 135 over the data network 130, such as via Internet protocol (IP) sessions, with the authoring application 140 running on a merchant's or other publisher's system.

Various systems and methods for creating content, such as multimedia files and objects, are known and are contemplated as suitable for implementing the embodiments of the invention. The publishing system 135 includes or interacts with an authoring application 140 for compiling these files and objects into decks, where a deck is a bundle of multimedia content that is specific to one merchant, or to any other entity or affiliated group of entities. As a non-limiting example, a deck may be specific to one store, one chain of stores, or to all of the stores in a shopping mall.

The multimedia content comprising a deck can include any type of data object, including text (e.g, ASCII), audio (e.g., Adaptive Multi-Rate (AMR), QUALCOMM Code Excited Linear Predictive Coding (QSELP), WAV, MPEG Audio Layer 3 (MP3), Musical Instrument Digital Interface (MIDI)), images (e.g., .jpg, .gif, or .png), video (e.g., .mpg), and miscellaneous (e.g., .vcard or .vcalendar). Furthermore, multiple versions of the same multimedia content that comprises a deck can be published in different formats for compatibility with different types of mobile devices and with different types of wireless networks and protocols.

Once the objects are created, the objects are available for compilation into decks, preferably using the authoring application 140. The authoring application 140 receives instructions from the author via an authoring interface, which is preferably a graphical user interface that is accessible by the authoring application 140 and/or the publishing system 135, either locally or on a remote client device. The authoring interface enables the author to direct the authoring application 140, which actually designs and compiles the appropriate objects into a deck.

Each deck is scripted into an interactive presentation format using a presentation language that is preferably a component of the authoring application. Compilation and scripting of content may occur at least in part in advance, such that a deck is, at least in part, prepared in advance of receiving a request for the content comprising the deck. Preferably, at least another portion of the deck can be incorporated "on-the-fly," so that dynamic information such as door-to-door instructions, real-time special offers, custom maps, and request-specific content can be added immediately before sending the deck to a requesting mobile station 105.

The content comprising a deck is compiled into preferably a single file that facilitates playback to the user in an orchestrated manner. To this end, a deck is preferably created using one or more presentation languages usable for authoring interactive audiovisual presentations. Examples of suitable presentation languages include languages such as Synchronized Multimedia Integration Language (SMIL), Extensible Hypertext Markup Language (XHTML), Wireless Markup Language (WML), and the like. Authoring a presentation includes creation or retrieval of the multimedia content that comprises the deck, as well as specifying the ordering, transitions, layout, sequencing, and timing of the audio, visual, and tactile presentation (e.g., vibrate during playback) of the deck.

The authoring application 140 uses the presentation language to generate a set of scripting modules that functions as instructions for presenting the multimedia content as a deck. Thus, these scripting modules preferably can be transferred with the multimedia content in a single message so that the message includes instructions and pointers that direct the mobile station 105, (preferably via the CDA client 145,) as to how to display the individual multimedia objects included in the content.

In certain exemplary embodiments, the presentation language is SMIL. The elements of the bundle of multimedia content comprising a deck are assigned a number of attributes that control the manner presentation of each element, and thus, of the presentation as a whole. To define the timeline of the presentation, the <dur> attribute is used to specify how long a particular element or group of parallel elements will be visible when the deck is played back via the CDA client 145. The <seq> element defines the sequence in which the elements or groups of parallel elements are displayed by listing elements as children in the desired order. The <repeatCount> attribute specifies the number of repetitions for displaying the elements or groups of parallel elements. Any of these or any other SMIL attributes and elements can be fixed at any time include when the deck is authored or transmitted, or can be variable parameters the values of which are established by user preferences expressed via the preferences module. For example, the user may preselect preferences that dictate the value of variable parameters, such as how long each page or card in each deck is displayed, whether the map page is displayed first, and whether each deck autoplays in a continuous loop until a command is given to proceed to the next deck.

The publishing system 135 also includes a publishing server and a content repository for storing the published content for delivery to multiple mobile stations. The content repository is preferably a memory element of the publishing system 135 and is populated with decks, elements of decks, and other multimedia content that has been or can be easily compiled into presentation format using the authoring application 140 and/or other applications within the publishing system 135. The publishing server is preferably a high speed processor and associated applications that respond to requests to add, remove, or update the content that is stored in the content repository.

The publishing server can also respond to requests for content that have been translated and relayed by the content server 125. The content server 125 selectively requests and retrieves preformatted content from the appropriate publishing system 135 for transmission to a mobile station 105, according to the content of a search query generated by the mobile station 105. The content server 105 receives the request for content preferably as a text message delivered over the text transport system 120, performs any necessary translation or modification of the request for content to facilitate delivery over the data network 130, and routes the request for content to the appropriate publishing system 135.

Request for Content

The search query generated by the mobile station 105 forms the basis of a request for content. In preferred embodiments, the search query is generated by interaction of a user of the mobile station 105 with Content Delivery Application (CDA) client software that is resident on the mobile station 105. In the embodiments described herein, the CDA client is an application developed in a programming language such as JAVA 2 Platform Micro Edition (J2ME), although any programming language suitable for developing applications for wireless devices can be used.

To generate a search query, the user of a mobile station accesses a GUI provided by the CDA client 145, and enters keywords and other parameters that identify the type of content that the user wishes to receive. Examples of keywords include words or phrases that identify a particular merchant or other entity by name (e.g., "Pizza Joes"), a merchant type (e.g., "restaurant" or "movie theater"), or a product or service (e.g., "pizza" or "shoe repair"). Additional parameters include location identifiers, business hours, and merchant status (e.g., "open now" or "open 24 hours").

The parameters can be entered manually by physically interacting with the GUI via an input device (e.g., a keypad), and in certain embodiments, the parameters can be entered using voice recognition technology.

The search query can be very narrow, including only one or two parameters such as merchant type and ZIP code, or very broad, including any number of parameters with varying degrees of specificity, such as merchant name, status, or address.

The parameters are passed to the CDA client 145, which then formulates the search query, and generates the request for content. As an example, the user enters the following parameters—PRODUCT="pizza" and GEOGRAPHIC TARGET="home", preferably in predefined fields that are displayed. These parameters indicate that the user would like a hit list that contains merchants that provide pizza, and that are within a predefined distance from the user's home address or ZIP code. The preferred distance is established by the user or by default in the preferences module of the CDA client, and provides hits that fall within a predefined radius. The user's home address or ZIP code can also be established via direct entry into the preferences module, or the preferences module can "learn" by prompting the user to save geographic targets as the targets are entered as parameters for searches. For instance, the user may enter a particular ZIP code as a geographic target for a particular search. The CDA client 145 automatically prompts the user "DO YOU WANT TO SAVE THIS LOCATION?" either as a default or in a list of favorite geographic targets. As another alternative, the user may transmit the search query without a geographic target, and then may receive a response that includes a prompt for a geographic target.

Once the search query has been formulated, the CDA client, either proactively or in response to additional user commands, issues the request by sending it over the access network 110 to the content server 125.

In most implementations, it is preferable to optimize the efficient use of the access network 110 by issuing the request for content over the text transport system 120 rather than the multimedia transport system 115. Thus, the request is transmitted as a text message rather than as a multimedia message. The request can be transmitted via any suitable text messaging protocol, examples of which include transaction oriented protocols, such as SMS, or session oriented protocols, such as Unstructured Supplementary Service Data (USSD). In alternative embodiments, the request is issued over the multimedia transport system 115 as a text-only MMS message.

In addition to the search query, the request includes a destination code that is appended by the CDA client 145. The destination code identifies the request as instructions that are to be routed to the content server 125. This destination code notifies a messaging service center (i.e., SMSC 270 in the embodiment shown in FIG. 2) in the text transport system 120 to forward the request to the content server 125. The request preferably also includes one or more origination identifiers, such as an IP address, domain name, location information (e.g., serving cell site), or a telephone number associated with the mobile station 105.

Figure 2:
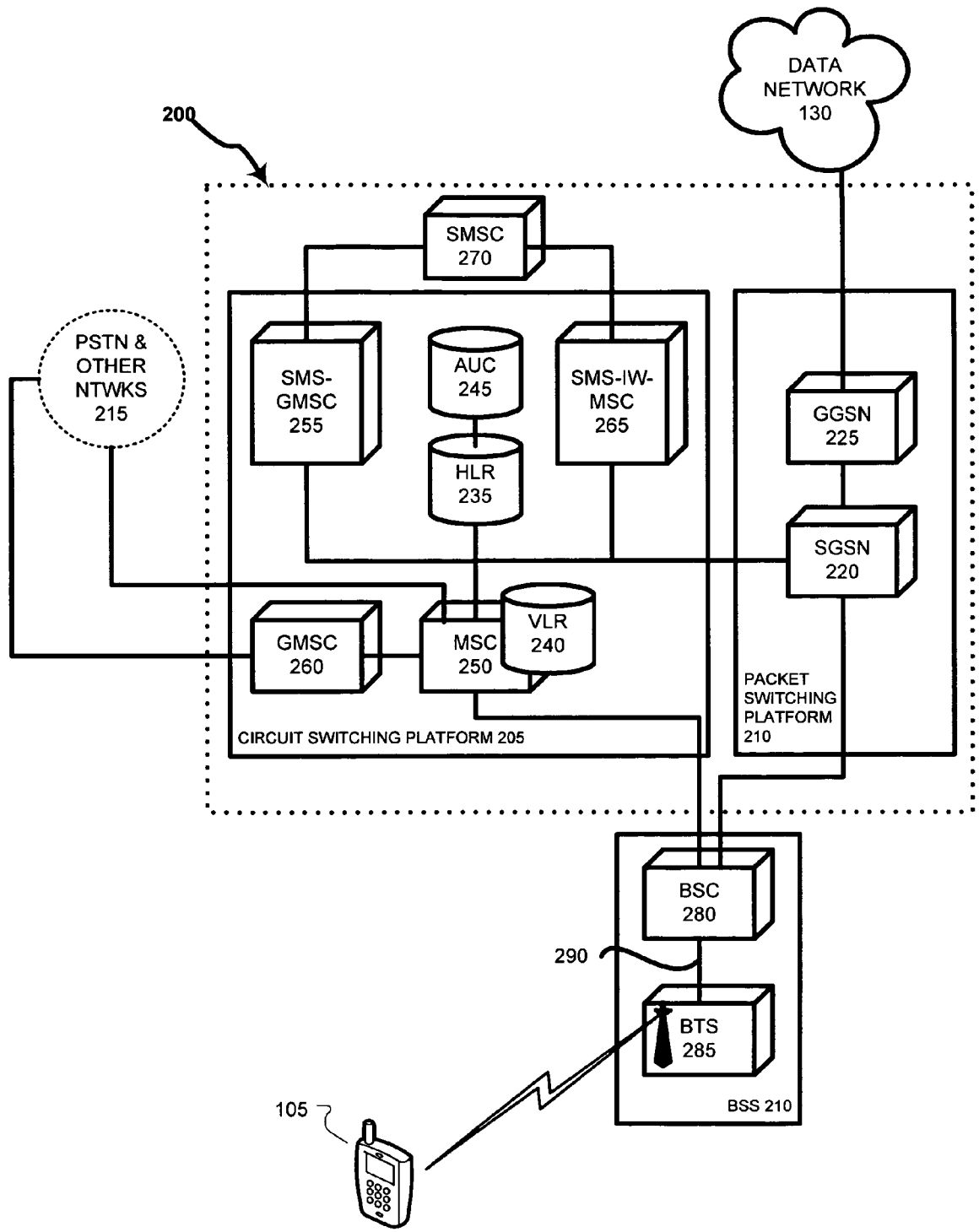
FIG. 2 is a block diagram of an exemplary access network, according to certain embodiments of the invention.

FIG. 2 is a block diagram of some relevant portions of an exemplary access network 110. The access network 110 is, for purposes of example and not of limitation, an ERICSSON GSM network having a GSM core network 200. The GSM core network 200 includes two major subsystems—namely, a circuit switching platform 205, and a packet switching platform 210.

The circuit switching platform 205 performs higher layer functions, such as call processing within the GSM network, and between the GSM network and other voice/data networks 215, such as a public switched telephone network (PSTN), other public land mobile networks (PLMNs), and a packet-switched public data network (PSPDN), such as the Internet, or an Intranet or X.25 network.

In the embodiments associated with FIG. 2, the packet switching platform 210 is a GPRS Support Node (GSN), which consists primarily of hardware (e.g., backplane switches, interfaces, and processors) and software applications that administer GPRS protocols and perform session and mobility management. The GSN software applications include the Serving GPRS Support Node (SGSN) 220 and/or Gateway GPRS Support Node (GGSN) 225 modules.

The physical or functional elements of the circuit switching platform 205 may include a Home Location Register (HLR) 235, a Visitor Location Register (VLR) 240, an Authentication Center (AUC) 245, and a Mobile Services Switching Center (MSC) 250, a Short Message Service Gateway MSC (SMS-GMSC) 255, a Gateway MSC (GMSC) 260, an SMS Interworking MSC (SMS-IW-MSC) 265, and a SMS Center (SMSC) 270. The HLR 235 supports subscriber data management. The VLR 240 contains temporary subscriber information that enables the MSC 250 to provide communication services to users.

The functionality of SGSN 220 and GGSN 225 may reside in different physical nodes or may be combined in the same physical node or network element. The SGSN 220 and GGSN 225 preferably contain GPRS backbone network protocol (internet protocol, or "IP") routing functionality, and are interconnected via IP routers. In certain embodiments, the GGSN 225 and the SGSN 220 collect usage information that is utilized to charge the user for the user's access and usage of the mobile advertising and directory assistance services of the various embodiments of the present invention. In certain embodiments, the mobile station 105 is charged according to a tariff, which may rate any access to the service according to any number of metrics, including but not limited to: the number of search queries issued; the size and/or quantity of the corresponding decks identified and/or downloaded to the mobile station 105; the size and/or quantity of decks actually viewed; the number or value of coupons redeemed or orders placed; the types of merchants; time of day; or any other quantifiable variables.

The SGSN 220 forwards incoming and outgoing payload data addressed to or from a mobile station 105 that is attached within the service area of the SGSN 220. The SGSN 220 may also function in the packet-switched environment much like the VLR 240 functions in the circuit-switched environment. User information, such as authentication triplets, is exchanged directly between HLR 235 and the SGSN 220.

The GGSN 225 provides an interface with external IP packet networks such as the Data Network 130, which in the exemplary embodiments, is the Internet. Thus, the GGSN 225 also provides interconnect points to Internet Service Providers (ISPs). From the point of view of Data Network 130, the GGSN 225 acts as a router for the IP address of each user. The GGSN 235 also interrogates the HLR 235 to obtain information regarding the location of the mobile station 105.

The GSM core network 200 includes and interfaces with various physical elements of the GSM network, including at least one base station system (BSS) 210. The MSC 250 interfaces directly with base station system (BSS) 210 which performs all radio-related functions for the GSM network. Although numerous configurations are possible, the BSS 210 shown in FIG. 2 includes one base station controller (BSC) 280 and one base transceiver station (BTS) 285. The BSC 280 is a functional entity that provides and controls the logical interconnection between the MSC 250 and the BTS 285. The BSC 280 may be physically located with the BTS 285, or may communicate with the BTS 285 via an interface 290, such as an Abis interface. The BTS 285 corresponds to a sector served by the BSS 210, and consists primarily of radio equipment such as antennas and radio transceivers needed to provide a radio interface to mobile stations operating in a single cell. Monitoring and control functions for the GSM network are performed by an operation and support system (OSS) (not shown).

It should be noted that the network elements shown are not necessarily physical elements, but may be independent or integral functional elements of the GSM network, the names of which often vary according to manufacturer. For example, the VLR 240 may be integral to the MSC 250. Furthermore, the access network may include any combination of suitable communications protocols and media for exchanging information according to the systems and methods of this invention. Examples include, but are not limited to, TCP/IP links, Signaling System 7 (SS7) links, fiber channels, wireless channels, and any other suitable communications protocols and media now known or yet to be developed.

The request for content triggers a series of interactions between the user, the CDA client 145, the content server 125, the authoring application 140, and the publishing system 135. These interactions involve providing an initial response to the request for content (i.e., the list of hits that identifies content that corresponds to the search query) and delivering the requested multimedia content (i.e., the decks identified by the pick query). The interactions take place using the Internet as the data network 130, and a GSM network as the access network 110. The systems and methods supporting these interactions are described in more detail with reference to FIG. 2 and FIG. 3.

Initial Response to the Request for Content

In certain embodiments, the initial response to the request for content is a list of hits that is delivered to the mobile station. This list of hits identifies decks that meet the criteria specified by the search query. In certain embodiments, the list of hits is further limited by additional geographic criteria provided by the Presence, Availability, and Location Services (PALS) system.

The list of hits is interactive in that the user of the mobile station 105 can craft a pick query by selecting one or more items from the list of hits, where each selection identifies a deck that the user wants to download to the mobile station. This pick query is then sent to the content server 125, which retrieves the selected decks from the publishing system 135 for delivery to the mobile station 105.

Figure 3:
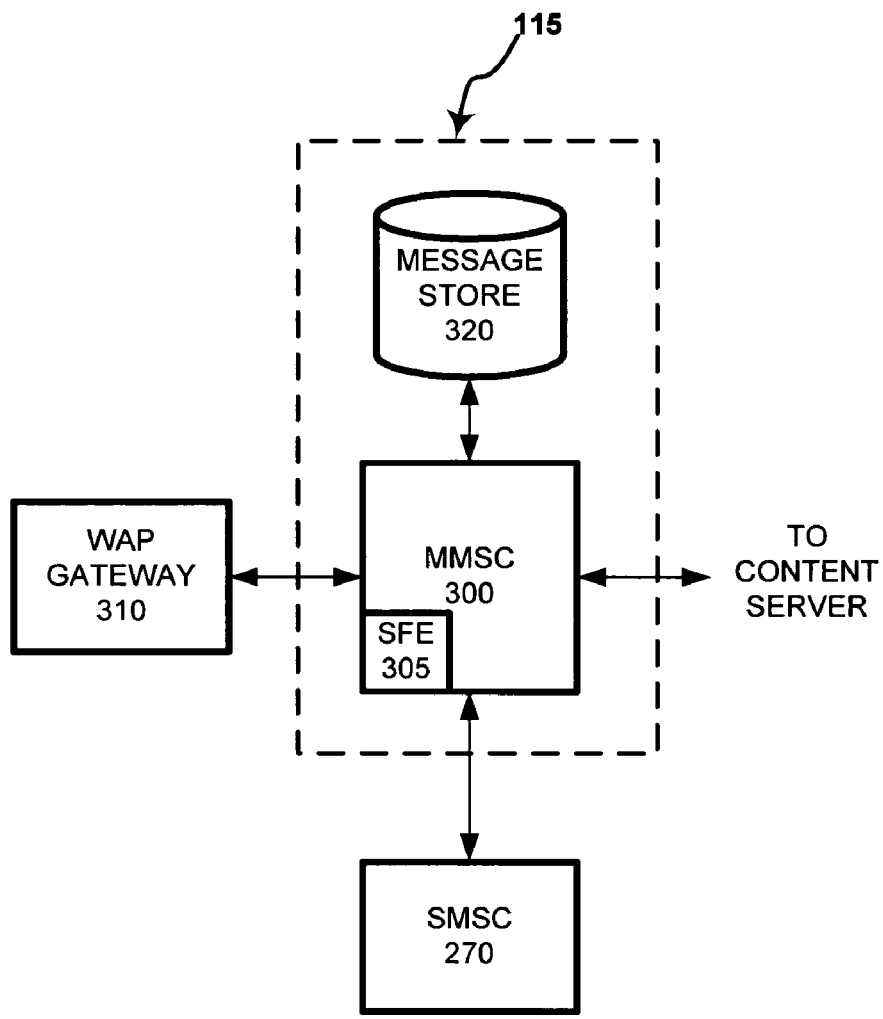
FIG. 3 is a block diagram showing an MMS network as an exemplary messaging infrastructure, according to certain embodiments of the invention.

FIG. 3 is a block diagram of a multimedia transport system 115, which includes a Multimedia Messaging Center (MMSC) 300 that serves a particular domain. The MMSC 300 implements store-and-forward functionality via a Store and Forward Engine (SFE) 305, a message store 320 and various application programming interfaces (APIs) that allow applications such as the CDA client to send WAP push and SMS messages. The SFE 305 (also known as a MMS Proxy-Relay) interfaces with or includes a WAP Gateway 310, which ensures that messages are delivered whenever the mobile station is available and provides over the air (OTA) security, typically including encryption and decryption. Internal or external applications can inquire and obtain the status of messages that have been pushed by the WAP Gateway 310 application and/or system. The WAP Gateway 310 can also serve to compile raw wireless markup data for use by the CDA client 145 and/or a microbrowser resident on the mobile station 105, as well as to translate information received from the mobile station 105 into wireless markup data. In the exemplary embodiments, the WAP Gateway 310 functionality is provided by GGSN 225.

Delivery of Content

As mentioned above with respect to the exemplary embodiments, the decks identified in the search query and selected in the pick query are delivered to the mobile station 105 as MMS messages. Preferably, however, these MMS messages are delivered differently from regular MMS messages, which are delivered to an inbox or other message store in the mobile station 105. Rather, MMS messages bearing the requested advertising, directory assistance, and associated multimedia content are distinguished from regular messages so that the CDA client 145 recognizes responses to search and pick queries, and automatically provides interactive access to and/or launches presentation of the requested decks. Alternatively, MMS messages bearing decks can reside along side other MMS messages in an MMS inbox, although the decks are preferably easily distinguishable from other MMS messages.

Regular MMS messages are delivered to a mobile station 105 via an MM1 (Multimedia Messaging Reference Point 1) interface, which defines the link between the mobile station 105 and the MMSC 300. Certain embodiments distinguish messages directed to the CDA client 145 by utilizing an alternative interface, so that messages carrying decks are not deposited in the MMS inbox with other MMS messages.

Figure 4:
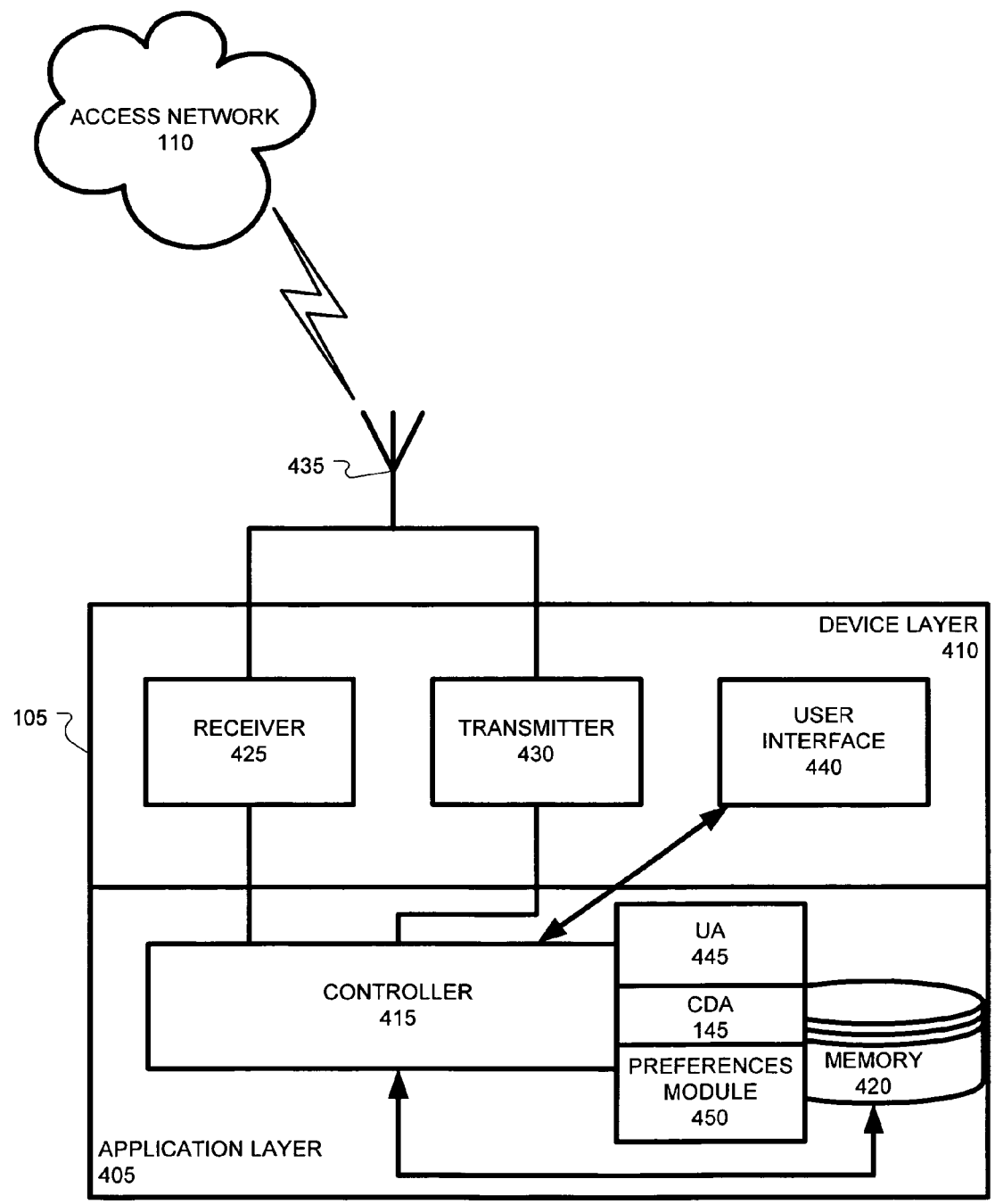
FIG. 4 is a block diagram illustrating certain functional elements of an exemplary mobile station.

FIG. 4 is a block diagram illustrating certain functional elements of the exemplary mobile station 105. Preferably, the mobile station 105 comprises a mobile terminal (MT) and terminal equipment (TE), and includes an application layer 405 and a device layer 410. The device layer 410 includes at least two distinct elements—the ME (Mobile Equipment) and the SIM (Subscriber Identity Module). The application layer 405 includes a processing element, shown as controller 415. The controller 415 can be any suitable microprocessor circuit, microcontroller, or similar data processing device that executes program instructions stored in a memory 420. Examples of suitable processing devices include programmed general or special purpose mobile device microprocessor, micro-controller and peripheral integrated circuit elements, ASIC or other integrated circuit, digital signal processor, hardwired electronic or logic circuit such as a discrete element circuit, programmable logic devices such as a PLD, PLA, FPGA or PAL, and the like. In general, the controller 415 is any device capable of implementing the functionality described herein.

The memory 420 can be implemented using any suitable combination of readable, writable, and/or re-writable volatile (e.g., dynamic RAM or static RAM) or non-volatile (e.g., ROM, PROM, EPROM, EEPROM, optical ROM disk, or flash) memory elements. In general, the memory 420 is any device capable of temporarily or permanently storing data.

The application layer 405 includes a User Agent (UA) 445 (such as a MMS client) that preferably resides in the memory 420 of the mobile station 105, or on an external device (not shown) that is communicatively associated with the mobile station, such as a personal computer or personal digital assistant (PDA). The UA 445 is an application layer function that provides the user with the ability to view, compose and manipulate multimedia messages. The UA 445 is also responsible for sending and receiving multimedia messages via the message transfer services of the appropriate network protocols.

Referring again to FIG. 4, the device layer 410 of the exemplary mobile station 105 includes the physical and functional radio frequency (RF) components required for transmitting and receiving wireless communications. More specifically, the device layer 410 includes a receiver 425, a transmitter 430, and an antenna 435, the various components and functions of which are familiar to those skilled in the art.

The application layer 405 is operatively connected to the device layer 410, such that the controller 415 controls and/or monitors the operations of the transmitter 430 and the receiver 425, which are both operatively connected to the antenna 435. The controller 415 controls elements of the device layer 410 according to the program instructions, and/or according operator input received via a user interface 440 (input/output device), such as any integral or remote combination of keypad and viewable display functionality.

In certain embodiments of the invention, the CDA client 145 is an executable software module that interacts with and can be integral to the UA 445. In other embodiments, the CDA client 145 is a separate application that resides in the memory 420 or on a remote application server (not shown). In certain other embodiments, portions of the CDA client 145 are remote and other portions reside on the mobile station 105. With the benefit of the description provided herein, appropriate code to implement the functionality of the CDA client 145 can be readily developed by one of ordinary skill in the art. The CDA client 145 performs any combination of at least the following functions: provides an interface for the user to enter a search query; formats the search query for transmission to the content server; receives the response to the search query;

displays the response to the search query as an interactive list or other compilation of results ("hits"); provides an interface for the user to navigate through the hits; executes any code accompanying the content retrieved by the search query; provides an interface for the user to retrieve, access, view, and/or interact with one or more decks associated with each of the hits; provides an interface for the user of the mobile station 105 to set or change preferences; and receives updated content and associates the updated content with the appropriate deck or decks. The CDA client 145 includes or interacts with a preferences module 450 that may reside on the mobile station 105 or remotely.

In the GSM context, multimedia content is distributed in MMS message format. Thus, the exemplary GSM network 100 delivers the directory assistance and associated multimedia content as decks that are stored and possibly formatted into MMS messages at a MMSC (Multimedia Messaging Service Center) before being delivered to the user. Referring again to FIG. 1, the decks alternatively may be compiled into MMS messages at the content server 125, or in the publishing system 135.

Figure 5:
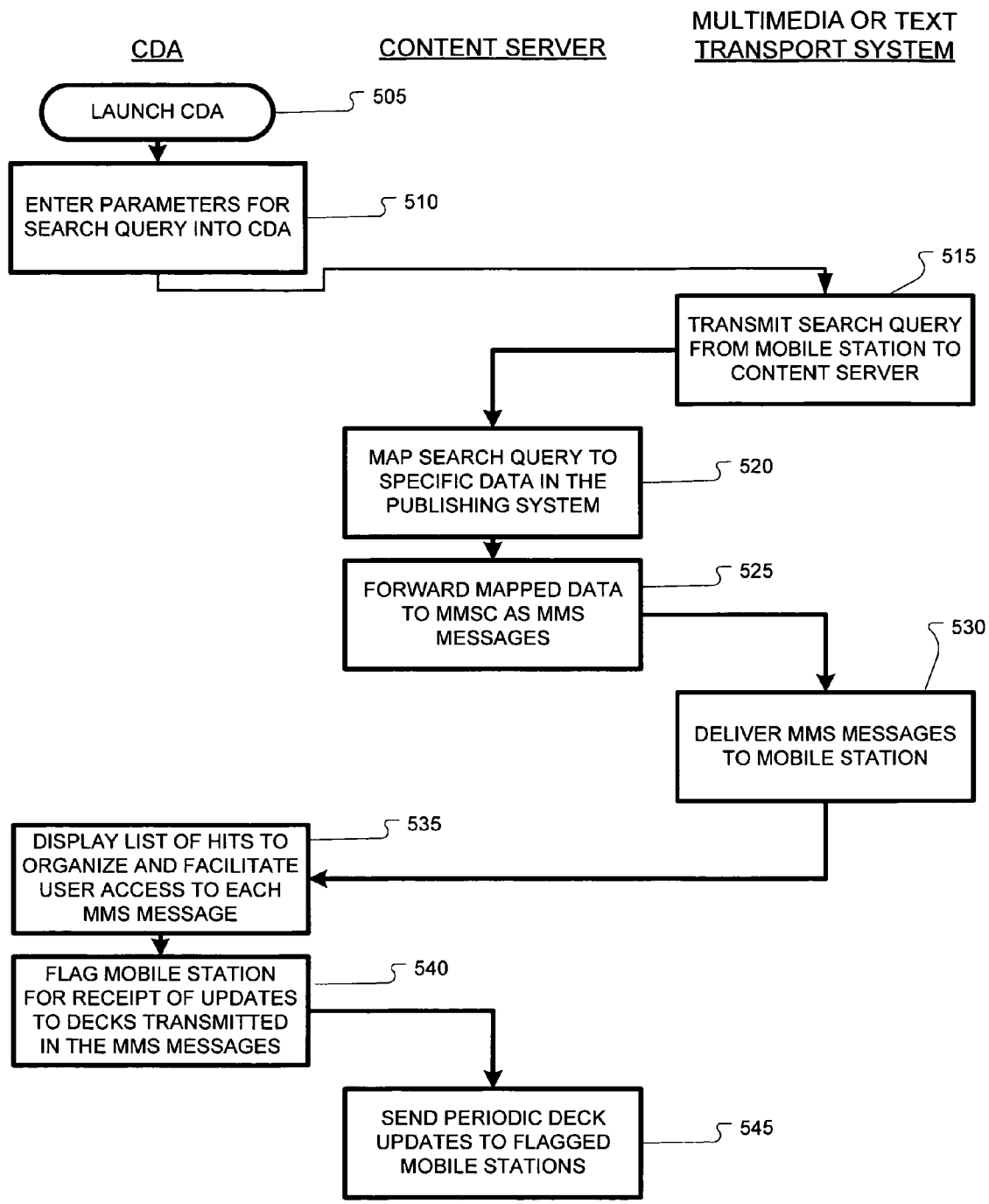
FIG. 5 is a functional diagram illustrating some of the steps of one method according to the various embodiments of the invention.
Figure 6:
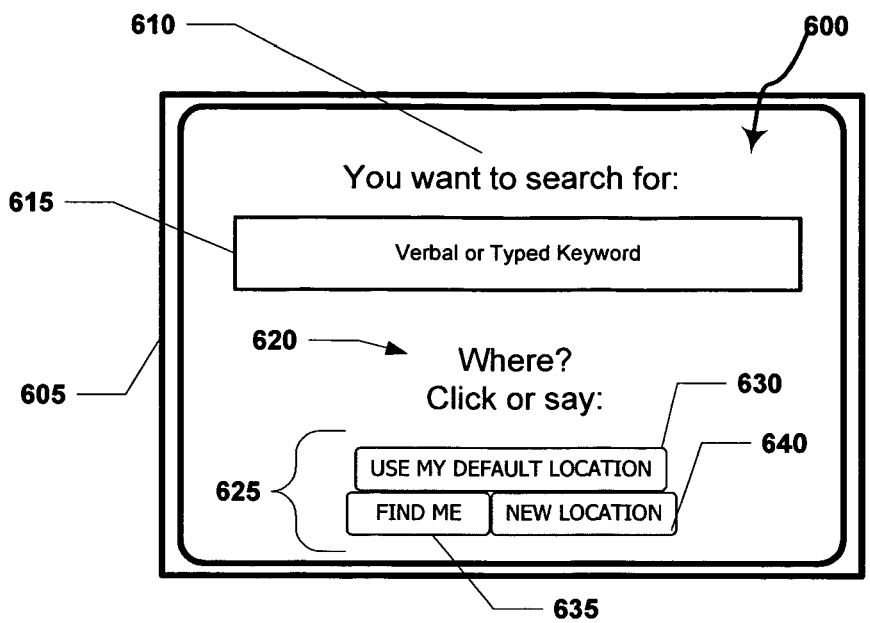
FIGS. 6 through 17 are screen shots illustrating only a few of an assortment of multimedia content and CDA client interfaces that may be incorporated into the various embodiments of the invention.

FIG. 5 is a flowchart illustrating an exemplary method for generating, transmitting, and responding to a search query using the CDA client. First, at step 505, the CDA client is launched. This may occur when the mobile station is powered up or at the user's command. Then, at step 510, parameters comprising the search query are entered via an interface, an example of which is shown in FIG. 6. At step 515, the search query is transmitted via the text transport system from the mobile station to the content server.

Then, each deck identified by the search query is retrieved by the content server and prepared for delivery. At step 520, the content server maps the search query to the appropriate publishing system(s), which respond with specific data (including decks) that correspond to the search query. The publishing system may compile the elements of the decks on the fly according to the date or other characteristics of the request, or according to the characteristics of the requesting mobile station or user. Compilation can include converting multimedia content (e.g., converting images from .jpg to .gif format) according to the capabilities of the mobile station. At step 525, the content server forwards the mapped data via the MMSC. The message is addressed for delivery to the user's mobile station.

Figure 7:
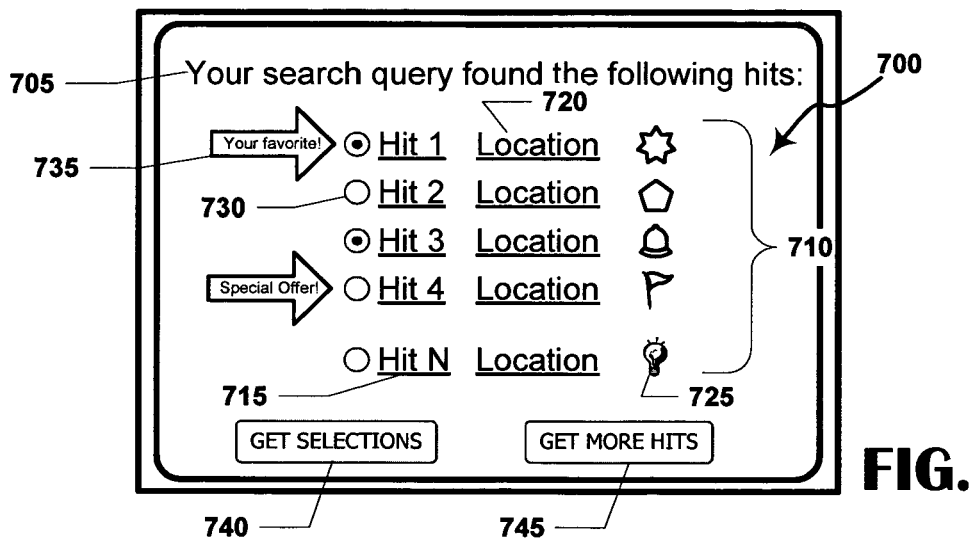

In the next step, the content server initiates a WAP connection (using any suitable data transmission protocol, such as CSD or GPRS) with the appropriate MMSC, and in the next step, sends the message(s) as the content of a WSP POST. In this manner, at step 530, a list of hits is delivered via the multimedia transport system as one or more MMS messages that are preferably delivered to the CDA client, rather than into the regular MMS inbox. The MMSC accepts the message and issues a confirmation to the content server over the same WAP connection, indicating "message sent." The MMSC then pushes a message indicator to inform the user's mobile station that an MMS message is waiting. In certain embodiments, this message indicator is processed by the UA while, in certain other embodiments, the message indicator is processed directly by the CDA client. The message indicator may include a tag that differentiates MMS messages that contain a response to a search query from other MMS messages. This tag ensures that responses to search queries are handled by the CDA client and are presented in a format such as that shown in FIG. 7. The mobile station retrieves the message by first, initiating a WAP session (using any suitable data transmission protocol, such as CSD or GPRS), and then, by issuing a command (e.g., WAP GET) to retrieve the MMS message from the MMSC. The MMS message is sent to the mobile station receiver 425 over the same WAP connection. Over the same WAP connection, the mobile station posts a "message received" acknowledgement, such as a WSP POST message. The MMSC informs the content router of the successful delivery, such as by pushing a "message delivered" indicator, which may in turn, be forwarded to the content server.

Referring again to the flowchart (FIG. 5), at step 535, the message indicator preferably consists of or links to a list of hits that is displayed in an organized fashion to enable the user to access each deck preferably in the same manner that the user would access a typical MMS message. In this embodiment, each hyperlink corresponds to an MMS message that contains the deck identified. At optional step 540, the CDA client generates and/or transmits a flag or other identifier that can be used for marketing research and at step 545 to push updates to decks.

According to one aspect of the invention, the content is also prioritized by any number of parameters, including but not limited to, bidding position, priority, time elapsed, proximity, or by one or more user defined parameters.

As mentioned above, a session oriented protocol such USSD is a suitable substitute for SMS as a vehicle for transmitting requests for content. To send a request via USSD, the user can dial a feature code which calls a USSD server. This call launches a remote application on the USSD server, which presents a response. The feature code must be specific to the search query that defines the content that is desired. For example, to retrieve results related to pizza restaurants, the feature code *PIZZA might be dialed. On conventional keypads, *PIZZA is dialed by keying *74992 and then by pressing SEND.

FIGS. 6 through 17 are screen shots illustrating only a few of an assortment of multimedia content and CDA client 145 interfaces that may be incorporated to implement the various embodiments of the invention.

FIG. 6 shows an exemplary search query page 600 displayed on a screen 605 or other display device integral to a mobile station 105 that has MMS capabilities. The CDA client 145 provides the search query page 600 as part of a GUI that includes controls and fields for interaction with the user. The controls and fields may be visible, audible, or any combination of both. The search query page 600 includes a visual or audible prompt 610 that directs the user to enter a search query which includes parameters that are displayed in field 615 as the parameters are entered manually or verbally. An additional prompt 620 may request narrowing information, such as a location or other search parameter. The search query page can also include various other controls 625 for issuing additional commands or for canceling or modifying the search. In the figure, the user may click or say NEW LOCATION 640 to specify a location as an epicenter to localize the search, or USE MY DEFAULT LOCATION 630 to avoid specifying a location, or FIND ME 653 to instruct the CDA client to initiate an autolocation routine using the presence, availability, and location services 150 provided in the exemplary environment.

Once the search query is entered to the user's satisfaction, the user may click or say SUBMIT to transmit the query. The results page 700 is generated in response to transmission of the search query, as detailed above. The message indicator 705 may be visible and/or audible, and can be any text, light, icon, graphic, or sound that notifies the user of the incoming or waiting response message(s). Each entry in the list of hits 710 includes: a text or audio identifier 715 that indicates the name of the merchant; a descriptor 720 that provides in brief additional information about the merchant, such as its location, its cuisine or type of product or service, or its proximity to the target or current location; an icon 725 that graphically identifies the merchant, such as a logo or the like; and a selector 730 control that allows the user to select the deck corresponding to the merchant for actual download or viewing if each of the decks listed have already been downloaded. Certain entries on the list of hits 710 may be highlighted or emphasized by providing an accentuator 735 that draws the user's attention to the accentuated entries. The accentuator 735 may include any means for differentiating certain entries in the list of hits 710, such as text, color, animation, images, sounds, and the like. The hits may be differentiable by characteristics such as inclusion in the user's list of favorites, popularity among all users, association with special offers or coupons, or satisfaction of search criteria such as range limits. The selector page 700 also includes a control 740 that instructs the CDA client 145 to get the selected decks or to display additional hits 745.

Figure 8:
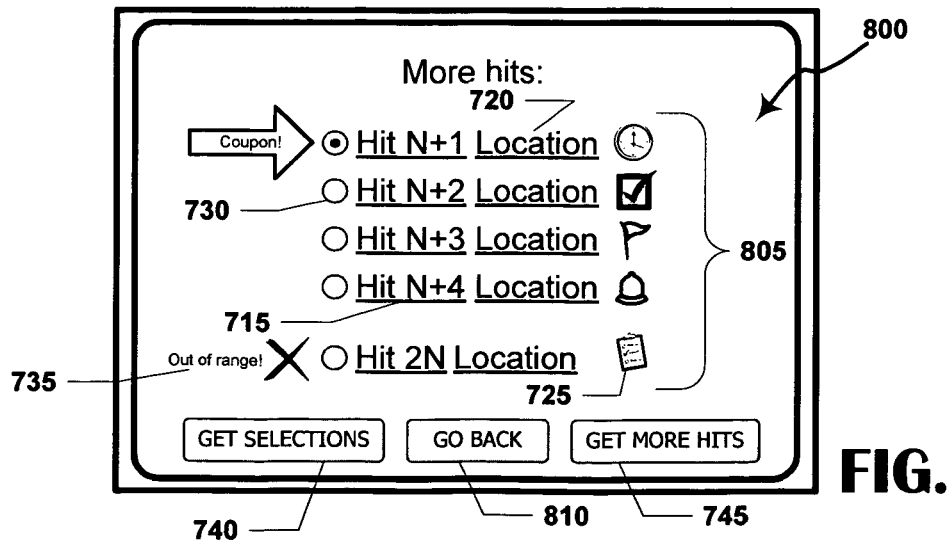

FIG. 8 shows an additional selector page 800 that displays an additional list of hits 805 that were not shown on the first selector page 700 for any number of reasons, such as to satisfy space and viewability constraints that limit the number of hits on a page, or to provide less favorable positioning to merchants that declined to pay a premium for a listing on the first selector page 700. The deck can include any number of additional selector pages 800, the number being limitable for example, by the criteria of the search query, and by user preferences or system limits on the maximum number of hits that can be delivered in response to a single search query. Each additional selector page 800 preferably includes navigation controls 745 and 810 that permit the user to advance or go back to previous or subsequent selector pages 800.

Figure 9:
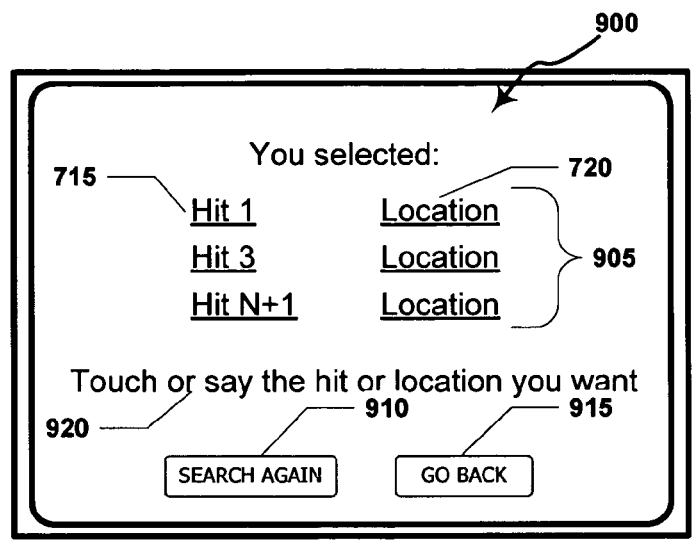

As shown in the results page 900 of FIG. 9, the exemplary CDA client 145 confirms the user's selection(s) by displaying a list of selected hits 905. If the user chooses to obtain a different list of selected hits 905, the user can click or say SEARCH AGAIN to activate control 910 to return to the search query page 600, or GO BACK to activate control 915 to return to the selector pages 700, 800. If the current list of selected hits 905 is satisfactory, however, the user responds to prompt 920 by can indicating which of the hits the user wants to view first by touching or saying the identifier 715 or otherwise identifying the chosen hit.

Figure 10:
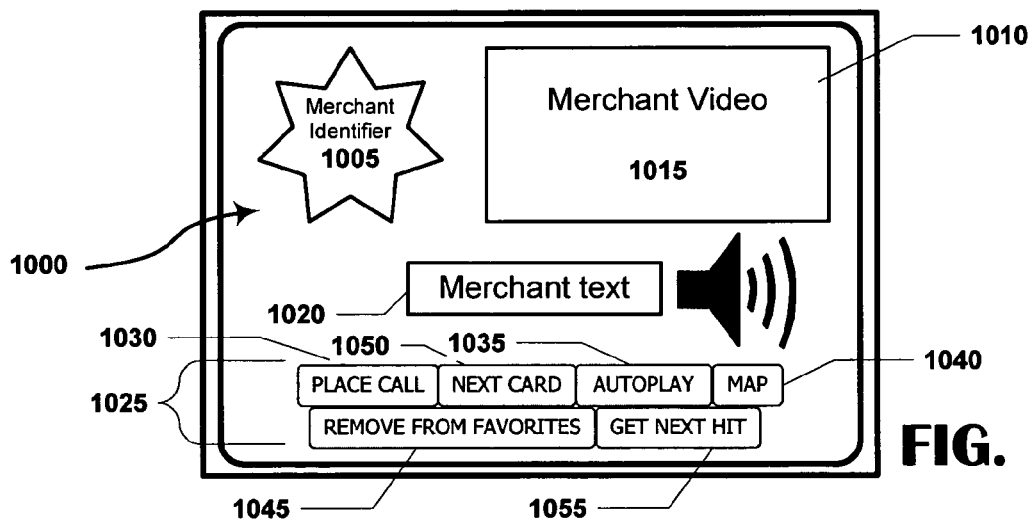
Figure 11:
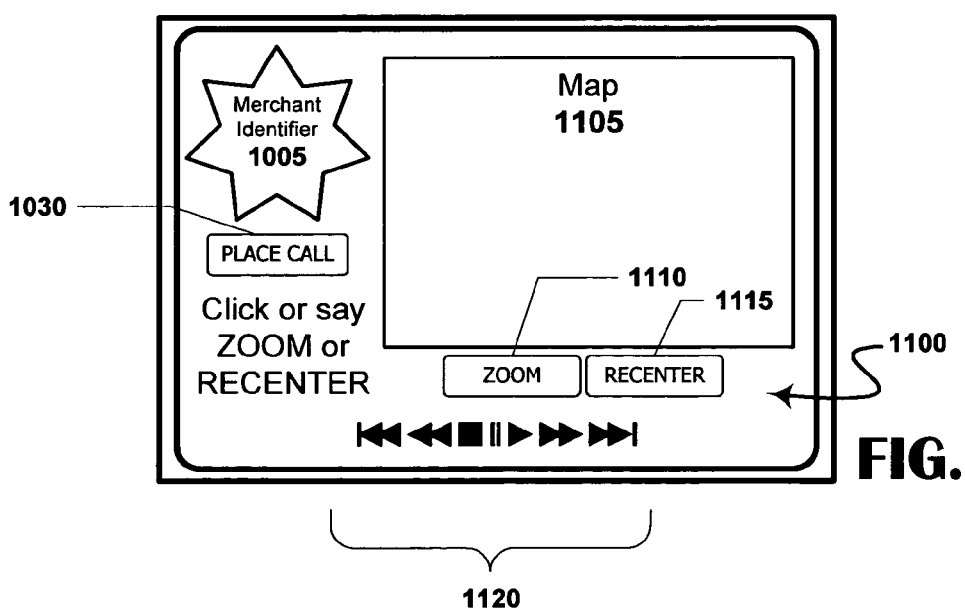
Figure 12:
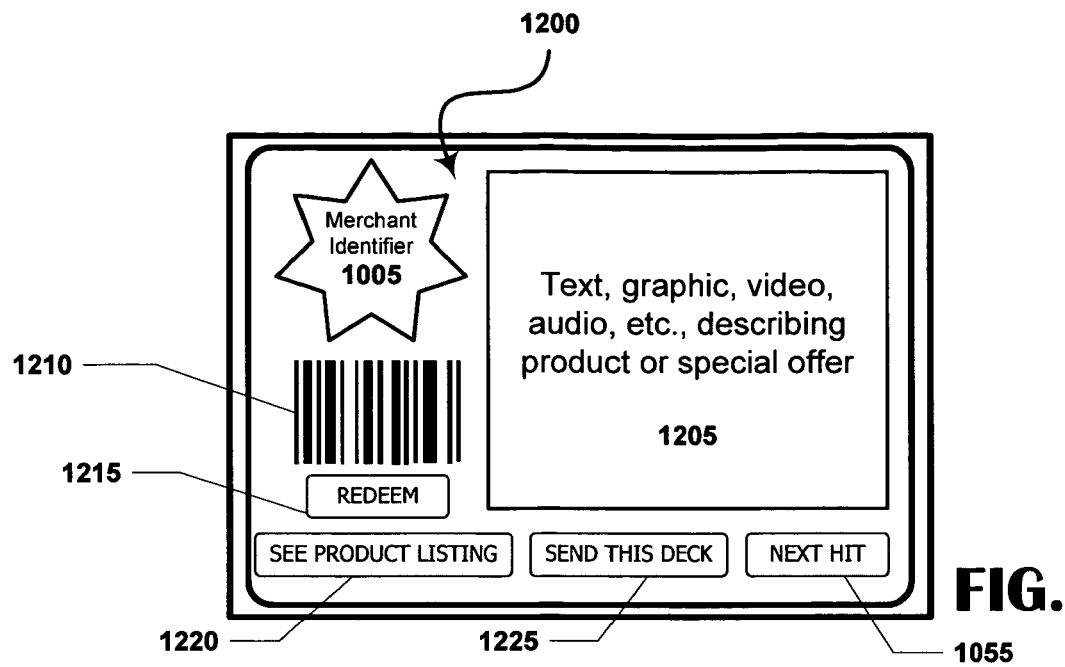

FIG. 10 shows an exemplary first card 1000 of the deck associated with the chosen hit. The deck automatically begins to play back to the user, presenting any combination of multimedia elements in any predefined order as specified by the authoring application, the publishing system, or the user preferences. As shown, the first card 1000 includes a merchant identifier 1005, such as a logo, trademark, slogan or other graphic. A small picture-in-picture like screen 1010 displays video content 1015, which may be accompanied by a soundtrack or narration. Additional text 1020 is displayed and preferably recited aloud. Various controls 1025 are provided to facilitate navigation, jumping to other related content, and performing actions. For instance, a PLACE CALL control 1030 causes the mobile station to initiate a voice or data call to the merchant. An AUTOPLAY control 1035 pauses and restarts autoplay of the deck. A MAP control 1040 allows the user to jump to a card containing a map (shown in FIG. 11) or driving directions rather than continuing to view the deck in the predefined order. The user may add or remove the current deck from the user's Favorites collection using control 1045. Navigation controls 1050 and 1055 allow navigation between cards in a deck or multiple decks, respectively.

The next card 1100 in the exemplary presentation shows a map 1105 that is preferably specific to the user's current, default, or manually entered location. The map may be graphic and interactive such that the user may zoom or recenter the map by touching the map, as well as by using ZOOM control 1110 and RECENTER control 1115. Certain elements of certain cards carry through to selected subsequent cards in the deck. For example, the merchant identifier 1005 may be shown on every card in a deck. Navigation controls and call-to-action controls such as the NEXT CARD control 1050 and the PLACE CALL control 1030 are also included as appropriate. Those skilled in the art will appreciate that any of the controls can be graphically represented in any way, such as by pushbuttons or icons. For example, standard audio playback icons 1120 can be used to represent functions analogous to "play" (analogous to AUTOPLAY 1035), "pause", "stop" (return to results page 900 or to search query page 600), "fast forward" (NEXT CARD 1050), "rewind", and "skip" (NEXT HIT 1055).

The next card 1200 in the exemplary presentation presents information regarding special offers and discounts. To that end, card 1200 includes an element 1205 that communicates information about the special offers and discounts using text, graphics, video, and/or audio. The information element 1205 may be accompanied by a coupon 1210 identifying an offer or discount via any suitable means including a bar code, redemption code, or other information that must be communicated to the merchant wirelessly or directly to take advantage of the offer. To automatically redeem the coupon 1210, the user can preferably click or say REDEEM 1215 to initiate an automatic redemption process. The automatic redemption process may entail placing a call, sending a voice message, sending a text message, sending a multimedia message, and/or beaming the coupon via a short range wireless protocol such as Bluetooth. The coupon 1210 can also be redeemed manually, by simply showing the coupon to the merchant for a visual verification or scanning by an optical reader. Any other card in the deck including card 1200 can display a control 1220 that enables the user to jump to a product listing, as well as a control 1225 that enables the user to send the deck as a message to another user, or to another computer. As with all of the control elements, control 1220 and 1225 can be activated verbally or manually.

Figure 13:
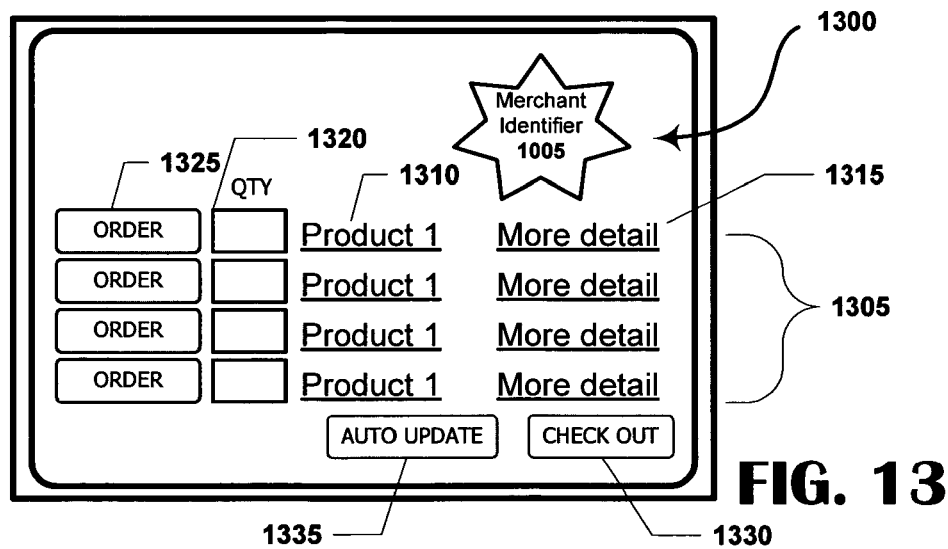

Activation of control 1220 invokes the presentation to display card 1300, shown in FIG. 13, which may also be accessed as a scheduled part of the presentation. Card 1300 includes a menu or other list of products 1305 that allows the user to review various product identifiers 1310 and descriptors 1315 associated with certain products, and to place orders by entering quantities 1320 or other parameters further defining the order, such as color, size, flavor, and the like. The product or products ordered can be added to a virtual shopping cart by clicking or saying ORDER 1325 in association with identifying the desired product. The order is processed when the user clicks or says CHECK OUT 1330. This or any other card may include an AUTOUPDATE control 1335 with which the user may indicate the desire to receive automatic updates to the current deck.

Figure 14:
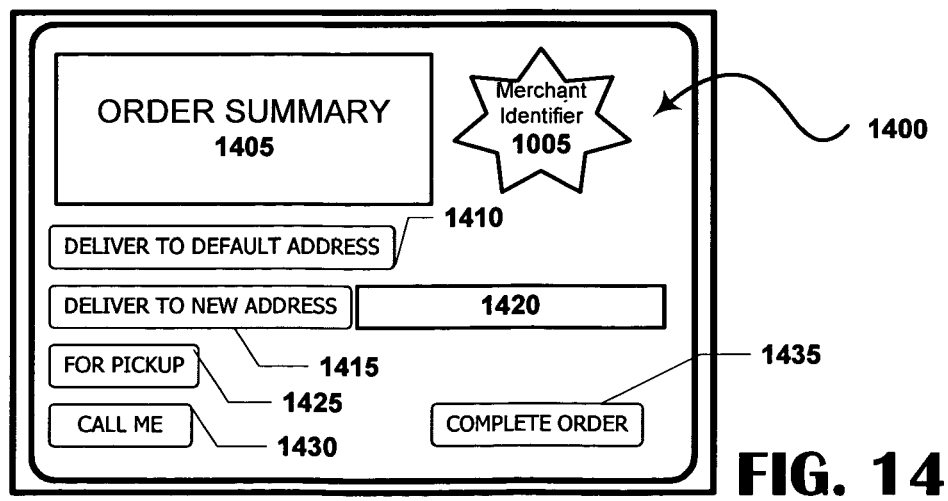

The checkout card 1400, shown in FIG. 14, includes an audible and/or visible order summary element 1405 that may include a confirmation of the cost and identities of the ordered items. The user can click or say: DELIVER TO DEFAULT ADDRESS 1410 to schedule delivery of the items to an address established in the preferences module as the user's preferred address for delivery; DELIVER TO NEW ADDRESS 1415 to access a field 1420 or prompt that allows the user to type or recite a new address for delivery; FOR PICKUP 1425 to indicate to the merchant that the user will pick the items up; or CALL ME 1430 to inform the merchant that the user intends to provide the information via a data or voice call. When the order details are complete, the user can click or say COMPLETE ORDER 1435 to finalize the transaction.

Figure 15:
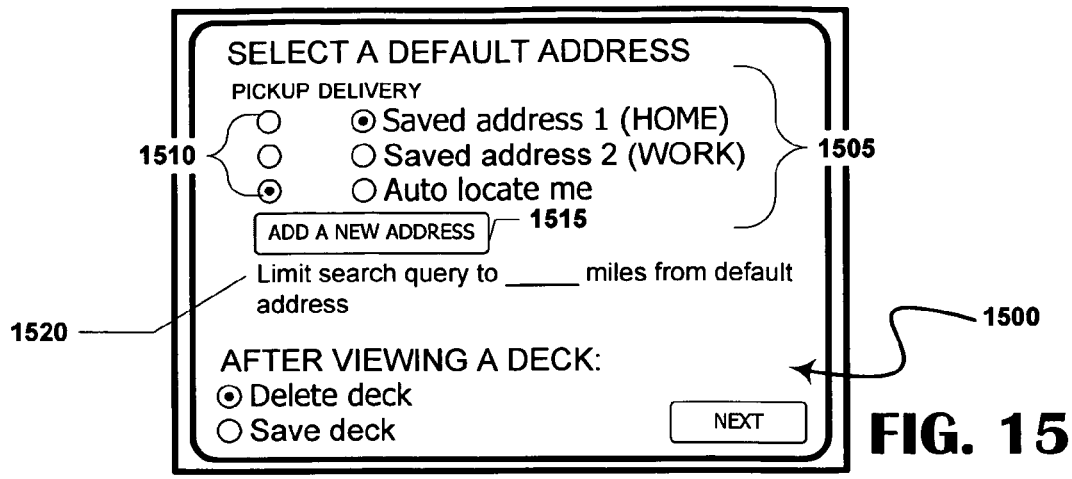
Figure 16:
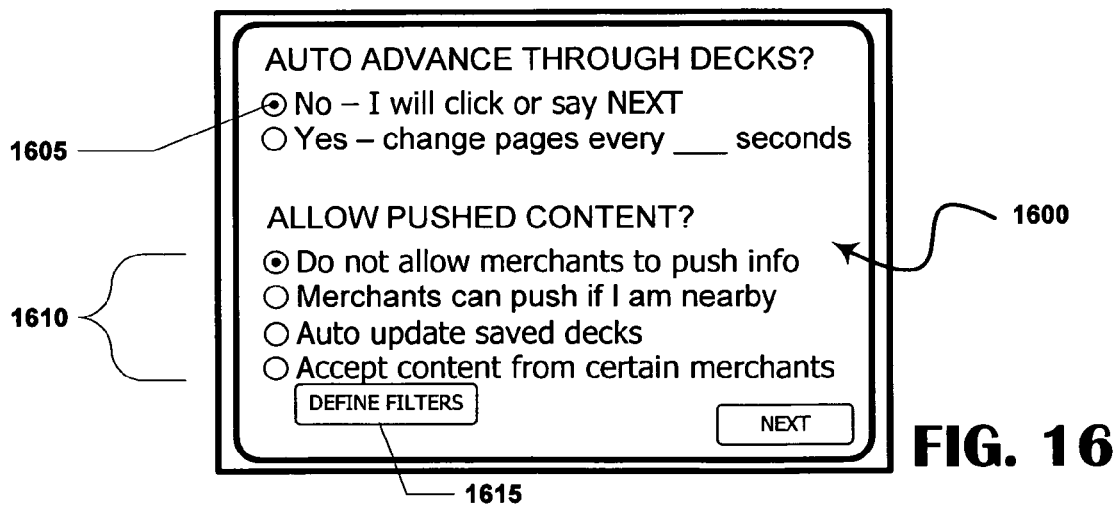
Figure 17:
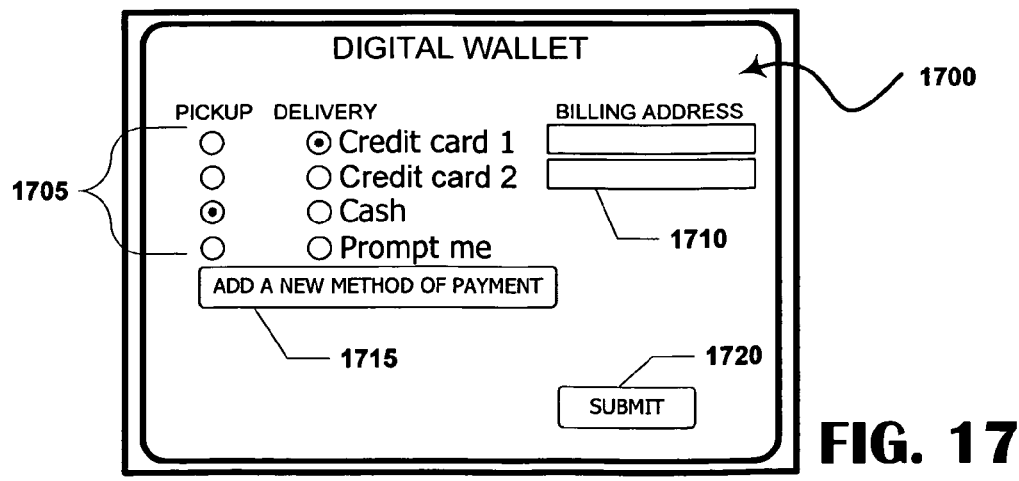

As previously mentioned, the various embodiments of the invention also include a preferences module that may be integral to the CDA client or can be remotely accessible via the mobile station or another computer accessed by the user of the mobile station. The preferences module presents a user interface that prompts the user to direct the CDA client, the content server, and/or the publishing system as to how to process CDA initiated transactions and search queries, as well as the search results and updates thereto. As examples, FIGS. 15, 16, and 17 show user interface screens 1500, 1600, 1700 for entering preferences. Screen 1500 (FIG. 15) prompts the user to select a default address that is to be used as the user's location when the user intends to pick up an order from the merchant, and a default address that is to be used as the user's location when the user intends to have the order delivered. For example, when the user wants to pick up an order, the user may want the search query to automatically locate the user to identify the decks that satisfy the search criteria, which may include a geographic range. Several addresses 1505 may reside in the preferences application, and with selector controls 1510 to indicate the user's preferences, as well as a control 1515 for entering a new address. The user receives a prompt 1520 requesting the user to limit searches to a predefined radius with respect to the location used for the search.

Screen 1500 also prompts the user to specify how decks that have been returned as search results should be handled—i.e., whether a deck that has been viewed should be deleted or saved. Using controls 1605 on screen 1600 (FIG. 16), the user may specify whether the cards of a deck should be autoplayed according to timing and sequence settings established when the deck is compiled. The user may opt to click or say NEXT after viewing each card to advance to the next card. Also shown on screen 1600, the preferences module prompts the user to allow or disallow pushed content including updates to decks, and to specify the exceptions to the general rule. The user can choose from preestablished filters 1610, which may include disallowing all pushed information, allowing nearby merchants to push advertising information, allowing updates only to decks that have been retrieved with a previous search query and saved in the CDA client, or accepting content only from certain merchants. In addition, the user can activate the DEFINE FILTERS control 1615 to create any number of custom rules for pushed content.

The preferences module is also usable to create a digital wallet, which may alternatively be created via the CDA client. The digital wallet can reside in any secure repository on the mobile station, in the wireless network, or in any remote database. Using screen 1700 shown in FIG. 17, the user can enter and save multiple methods of payment 1705, including credit card numbers, electronic funds transfer (EFT) information, and associated addresses 1710 that may correspond to or be chosen from the list of default addresses 1505 designated previously. The screen 1700 includes a prompt or control that allows the user to add new methods of payment, as well as controls that designate when a particular method of payment is to be used. For example, the user may wish to pay with cash when picking an item up, and with a credit card when the item is to be delivered. When the user has completed any or all of the pages in the preferences module, the user may check or say SUBMIT 1720.

Although described with respect to a CDA client resident on the mobile station, the present invention can be implemented using completely session-oriented applications. For instance, USSD calls can be used to launch a remote CDA application on the USSD server, or elsewhere. An initial feature code, such as *1, launches the remote CDA application, and the user then interacts with the remote CDA application to generate and transmit a search query and a subsequent pick query, and to receive the selected decks in response to the pick query.

Those skilled in the art will readily recognize analogous applications for alternative types of entities to benefit from the principles and teachings of the various embodiments. Rather than being merchant-related, a deck may consist of information related to non-commercial entity, including an individual or a non-commercial organization, such as a school. For example, individuals might publish decks including multimedia data elements such as a photo collage, a resume, or a personal advertisement. A school or a charity might publish a brochure. For any entity type therefore, the published decks can be transmitted by the wireless service in response to directory assistance requests in the same manner as for merchant organization.

The law does not require, and it is economically prohibitive to illustrate and describe every embodiment of the present invention. Thus, those skilled in the art will also appreciate that the mobile advertising and directory assistance described represents only one example of the various wireless communications and configurations that will be suitable for implementation of the various embodiments of the invention. Accordingly, the scope of the present invention is described by the claims appended hereto and supported by the foregoing.

What is claimed is:

1. A method for operating a content server to wirelessly provide bundled entity-related multimedia content to a wireless device in a wireless telecommunications network, the method comprising:

receiving, at a content server, a content search query from the wireless device, the content search query comprising a query parameter including at least one of a location of the wireless device, a geographic target location, a location of an entity, an entity type, an entity name, a product type, an entity characteristic, and a search radius;

mapping, at the content server, the content search query to multimedia content records stored in a publishing system by comparing the query parameter to the multimedia content records to determine a match that identifies which of the multimedia content records includes multimedia content associated with the query parameter, wherein each multimedia content record comprises a bundle of multimedia content associated with at least one entity, the multimedia content being compiled into an interactive multimedia presentation by the publishing system;

retrieving, at the content server, the interactive multimedia presentation identified by the match;

transmitting, at the content server, the interactive multimedia presentation to a multimedia messaging service center (MMSC) that is configured to receive the interactive multimedia presentation and to deliver the interactive multimedia presentation to the wireless device as at least one multimedia messaging service (MMS) message; and performing, at the content server, an update process to send an update for the interactive multimedia presentation to the wireless device, the update process comprising one of:

automatically transmitting the update for the interactive multimedia presentation to the wireless device if the update is available; and in response to a request received by the content server, transmitting the update for the interactive multimedia presentation to the wireless device if the update is available.

2. The method of claim 1, wherein receiving, at the content server, the content search query further comprises receiving the content search query, forwarded from a transport system, the content search query further comprising a server destination code that identifies the content server, and instructs the transport system to forward the content search query to the content server.

3. The method of claim 1, wherein receiving, at the content server, the content search query comprises receiving the content search query via a text transport system.

4. A content server for wirelessly providing bundled entity-related multimedia content to a wireless device in a wireless telecommunications network, the content server comprising:

a network interface;

a processor; and a memory, in communication with the processor and the network interface, the memory being configured to store instructions that, when executed, perform the steps of:

receiving, via the network interface, a content search query for content from the wireless device, the content search query comprising a query parameter including at least one of a location of the wireless device, a geographic target location, a location of an entity, an entity type, an entity name, a product type, an entity characteristic, and a search radius;

mapping the content search query to multimedia content records stored in a publishing system by comparing the query parameter to the multimedia content records to determine a match that identifies which of the multimedia content records includes multimedia content associated with the query parameter, wherein each multimedia content record comprises a bundle of multimedia content associated with at least one entity, the multimedia content being compiled into an interactive multimedia presentation by the publishing system;

retrieving the interactive multimedia presentation identified by the match;

transmitting the interactive multimedia presentation to a multimedia messaging service center (MMSC) that is configured to receive the interactive multimedia presentation and to deliver the interactive multimedia presentation to the wireless device as at least one multimedia messaging service (MMS) message; and performing an update process to send an update for the interactive multimedia presentation to the wireless device, the update process comprising one of:

automatically transmitting the update for the interactive multimedia presentation to the wireless device if the update is available; and in response to a request received by the content server, transmitting the update for the interactive multimedia presentation to the wireless device if the update is available.

5. A device for accessing bundled entity-related multimedia content in a wireless telecommunications network, the device comprising:

a processor;

an interface configured to receive a user input that defines a parameter of a search query for content, and to relay the user input to the processor;

a memory configured to store a content delivery application, the content delivery application comprising instructions that, when executed, cause the processor to perform the steps of:

generating the search query based upon the user, the search query comprising the parameter including at least one of a location of the wireless device, a geographic target location, a location of the entity, an entity type, an entity name, a product type, an entity characteristic, and a search radius;

transmitting the search query to a content server;

receiving, as at least one multimedia messaging service (MMS) message, at least one bundle of multimedia content related to the parameter identified in the search query, the multimedia content being compiled into an interactive multimedia presentation;

presenting the interactive multimedia presentation to a user of the wireless device; and performing at least one action of:

storing the interactive multimedia presentation in the memory;

forwarding the interactive multimedia presentation to another device as a multimedia message;

transmitting a status to the content server indicating that the interactive multimedia presentation has been presented;

transmitting a status to the content server indicating that the interactive multimedia presentation has been stored in the memory;

transmitting a status to the content server indicating that the interactive multimedia presentation has been forwarded; and receiving an update to the interactive multimedia presentation from the content server.

6. The device of claim 5, wherein the memory is further configured to store a preferences module, the preferences module comprising default values for the parameter.

7. The device of claim 5, further comprising an output device for presenting the interactive multimedia presentation to the user as any combination of audio, text, images, pictures, video, and printed material, and for soliciting additional user input.

8. A method for wirelessly providing bundled entity-related multimedia content to a wireless device in a wireless telecommunications network, the method comprising:

receiving, at a content server, a search query for content from the wireless device, the search query comprising a set of search parameters;

identifying, at the content server, at least two bundles of multimedia content that correspond at least in part to the search parameters;

transmitting, at the content server, the bundles of multimedia content to a multimedia messaging service center (MMSC) that is configured to receive the bundles of multimedia content and to deliver the bundles of multimedia content to the wireless device as at least one multimedia messaging service (MMS) message with instructions for ordering the presentation of the bundles of multimedia content, the order being determined at least in part by at least one of:

a relative popularity of the bundles;

a preference expressed by the user of the wireless device;

a relative priority of an entity that is associated with each of the bundles;

a relative geographic location of the entity that is associated with each of the bundles; and a relative degree to which the characteristics of each bundle correspond to the search parameters; and performing, at the content server, an update process to send an update for the presentation to the wireless device, the update process comprising one of:

automatically transmitting the update for the presentation to the wireless device if the update is available: and in response to a request received by the content server, transmitting the update for the presentation to the wireless device if the update is available.

9. The method of claim 8, wherein transmitting, at the content server, the bundles of multimedia content to the MMSC that is configured to receive the bundles of multimedia content and deliver the bundles of multimedia content to the wireless device as at least one MMS message with instructions for ordering the presentation of the bundles of multimedia content, the order being determined at least in part by the relative popularity by comparing a variable including at least one of:

a relative frequency of previous transmissions of each of the bundles to the wireless device;

a relative frequency of previous transmissions of each of the bundles to other wireless devices;

a relative frequency of previous downloads of each of the bundles to the wireless device;

a relative frequency of previous downloads of each of the bundles to other wireless devices;

a relative frequency of instances where each of the bundles has been saved to the wireless device; and a relative frequency of instances where each of the bundles has been saved to other wireless devices.

10. The method of claim 8, wherein transmitting, at the content server, the bundles of multimedia content to the MMSC that is configured to receive the bundles of multimedia content and deliver the bundles of multimedia content to the wireless device as at least one MMS message with instructions for ordering the presentation of the bundles of multimedia content, the order being determined at least in part by the relative priority of the entity that is associated with each of the bundles according to a method for keyword bidding, comprising:

selling a keyword to an entity;

ascribing the keyword as a characteristic of a favored bundle, the favored bundle being a bundle associated with the entity, the characteristic belonging to the set of search parameters; and determining whether the search parameters in the request for content include the keyword.

11. The method of claim 10, wherein:

if the search parameters in the request for content include the keyword, then transmitting, at the content server, the bundles of multimedia content to the MMSC that is configured to receive the bundles of multimedia content and deliver the bundles of multimedia content to the wireless device as at least one MMS message with instructions for ordering the presentation of the bundles of multimedia content such that the favored bundle is presented before the other bundles.

12. The method of claim 8, wherein transmitting, at the content server, the bundles of multimedia content to the MMSC that is configured to receive the bundles of multimedia content and deliver the bundles of multimedia content to the wireless device as at least one MMS message with instructions for ordering the presentation of the bundles of multimedia content such that the favored bundle is presented before the other bundles, the order being determined at least in part by the relative priority of the entity that is associated with each of the bundles according to a method for keyword bidding, comprising:

allocating a plurality of unique relational rankings to a keyword;

selling to a first entity a first ranking associated with the keyword;

selling to a second entity a second ranking associated with the keyword, the second ranking having lower positional priority;

ascribing the keyword as a characteristic of at least one bundle associated with the first entity and of at least one bundle associated with the second entity, the characteristic belonging to the set of search parameters; and determining whether the search parameters in the request for content include the keyword;

wherein if the search parameters in the search query include the keyword, then transmitting, at the content server, the bundles of multimedia content to the MMSC that is configured to receive the bundles of multimedia content and deliver the bundles of multimedia content to the wireless device as at least one MMS message with instructions for ordering the presentation of the bundles of multimedia content such that the bundle associated with the first entity is presented before the bundle associated with the second entity.

13. A method for placing an order via a wireless device in a wireless telecommunications network, the method comprising:

generating, at the wireless device, a search query for content, the search query comprising a search parameter;

transmitting, at the wireless device, the search query to a content server via the wireless telecommunications network;

receiving, as at least one multimedia messaging service (MMS) message at the wireless device, at least one bundle of multimedia content related to an entity identified by the search parameter, the bundle of multimedia content being compiled into an interactive multimedia presentation;

presenting, at the wireless device, the interactive multimedia presentation to a user of the wireless device, the interactive multimedia presentation comprising a menu comprising at least one item associated with the entity;

receiving, at the wireless device, an update for the interactive multimedia presentation;

receiving, at the wireless device, an input from the user, the input comprising a selection of one of the items presented in the interactive multimedia presentation; and transmitting, at the wireless device, an order to the entity, the order comprising the item selection.

14. The method of claim 13, wherein generating, at the wireless device, the search query comprising the search parameter comprises generating the search query, the search query comprising the search parameter including at least one of a location of the wireless device, a geographic target location, a location of the entity, an entity type, an entity name, a product type, an entity characteristic, and a search radius.

15. The method of claim 13, wherein transmitting, at the wireless device, the order to the entity comprises transmitting the order to the entity, the order comprising order details including at least one of a user identification information, a payment method, a billing address, a delivery address, an email address, a telephone number, a fulfillment method, a quantity, a color, and a size.

16. The method of claim 15, wherein transmitting, at the wireless device, the order to the entity comprises transmitting the order to the entity, the order comprising at least the fulfillment method, wherein the fulfillment method is one of pickup, delivery, and download.

17. A method for redeeming a coupon via a wireless device in a wireless telecommunications network, the method comprising:

generating, at the wireless device, a search query, the search query comprising a search parameter;

transmitting, at the wireless device, the search query to a content server via the telecommunications network;

receiving, at the wireless device as at least one multimedia messaging service (MMS) message, at least one bundle of multimedia content related to an entity identified by the search parameter, the bundle of multimedia content being compiled into an interactive multimedia presentation comprising a coupon for an item, the coupon comprising a redemption code;

receiving, at the wireless device, an update for the interactive multimedia presentation from the content server; and transmitting, at the wireless device, the redemption code to the entity.

18. The method of claim 17, further comprising:

receiving, at the wireless device, an interaction from a user of the wireless device, the interaction comprising selecting the item presented in the interactive multimedia presentation; and, wherein transmitting, at the wireless device, the redemption code comprises transmitting a request for the item to the entity, the request comprising the redemption code.

19. The method of claim 17, wherein transmitting, at the wireless device, the redemption code comprises the wireless device placing a voice call to the entity.

20. A method for receiving payment information from a wireless device in a wireless telecommunications network, the method comprising:

transmitting, at a content server, an interactive multimedia presentation to a multimedia messaging service center (MMSC) that is configured to receive the interactive multimedia presentation and deliver the interactive multimedia presentation as at least one multimedia messaging service (MMS) to a wireless device;

performing, at the content server, an update process to send an update for the interactive multimedia presentation to the wireless device, the update process comprising one of:

automatically transmitting the update for the interactive multimedia presentation to the wireless device if the update is available; and in response to a request received by the content server, transmitting the update for the interactive multimedia presentation to the wireless device if the update is available;

receiving, at the content server, a request for an item presented in the interactive multimedia presentation, the item request comprising a user identifier;

the content server querying a secure database, the secure database comprising a plurality of records, each record comprising payment information to facilitate electronic transactions;

the content server retrieving from the secure database a record associated with the user identifier in response to the query; and the content server utilizing the payment information to fulfill the item request.

21. The method of claim 20, wherein the content server retrieving from the secure database the record associated with the user identifier in response to the query comprises the content server retrieving from the secure database the record associated with the user identifier in response to the query, wherein the user identifier comprises a digital certificate.

22. A method for receiving entity-related directory assistance data using a wireless device in a wireless telecommunications network, the method comprising:

generating, at the wireless device, a text message comprising a request for content, the request comprising a parameter including at least one of a location of the wireless device, a geographic target location, a location of the entity, an entity type, an entity name, a product type, an entity characteristic, and a search radius;

transmitting, at the wireless device, the request to a content server;

receiving, at the wireless device, at least one multimedia messaging service (MMS) message comprising multimedia content related to an entity identified by the request, the multimedia content being formatted as an interactive multimedia presentation comprising at least one of contact information, directions, coupon codes, and advertisements; and receiving, at the wireless device, an update to the interactive multimedia presentation from the content server.

23. The method of claim 22, wherein generating, at the wireless device, the text message comprises generating, at the wireless device, the text message in response to a user dialing a feature code using the wireless device.

24. A non-transitory, computer-readable medium of a device comprising instructions that, when executed by a processor of the device, cause the processor to perform steps of a method, comprising:

generating the search query based upon the user, the search query comprising the parameter including at least one of a location of the wireless device, a geographic target location, a location of the entity, an entity type, an entity name, a product type, an entity characteristic, and a search radius;

transmitting the search query to a content server;

receiving, as at least one multimedia messaging service (MMS) message, at least one bundle of multimedia content related to the parameter identified in the search query, the multimedia content being compiled into an interactive multimedia presentation;

presenting the interactive multimedia presentation to a user of the wireless device; and performing at least one action of:

storing the interactive multimedia presentation in the memory;

forwarding the interactive multimedia presentation to another device as a multimedia message;

transmitting a status to the content server indicating that the interactive multimedia presentation has been presented;

transmitting a status to the content server indicating that the interactive multimedia presentation has been stored in the memory;

transmitting a status to the content server indicating that the interactive multimedia presentation has been forwarded; and receiving an update to the interactive multimedia presentation from the content server.

25. The computer-readable medium of claim 24, further comprising instructions for storing a preferences module comprising default values for the parameter.

26. The computer-readable medium of claim 24, further comprising instructions for presenting the interactive multimedia presentation to the user as any combination of audio, text, images, pictures, video, and printed material, and for soliciting additional user input.

* * * * *